(12) United States Patent
Li et al.

(10) Patent No.: US 11,100,895 B2
(45) Date of Patent: Aug. 24, 2021

(54) DISPLAY METHOD, DISPLAY APPARATUS, AND GRAPHICAL USER INTERFACE

(71) Applicant: Huawei Technologies Co., Ltd., Shenzhen (CN)

(72) Inventors: Jizhen Li, Shenzhen (CN); Weidong Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 16/190,992

(22) Filed: Nov. 14, 2018

(65) Prior Publication Data

US 2019/0080673 A1 Mar. 14, 2019

Related U.S. Application Data

(63) Continuation of application No. PCT/CN2017/076508, filed on Mar. 13, 2017.

(30) Foreign Application Priority Data

Aug. 16, 2016 (CN) .......................... 201610674971.3

(51) Int. Cl.
*G09G 5/14* (2006.01)
*G09G 3/20* (2006.01)
(Continued)

(52) U.S. Cl.
CPC .............. *G09G 5/14* (2013.01); *G06F 3/0484* (2013.01); *G06F 3/0488* (2013.01); *G06F 3/147* (2013.01);
(Continued)

(58) Field of Classification Search
CPC ...... G06F 3/0414; G06F 3/044; G06F 3/0484; G06F 3/0488; G06F 3/147; G09G 5/14; G09G 5/377; G09G 3/20
(Continued)

(56) References Cited

U.S. PATENT DOCUMENTS

2010/0277443 A1 * 11/2010 Yamazaki ........... G02F 1/13452
345/204
2011/0164047 A1 7/2011 Pance
(Continued)

FOREIGN PATENT DOCUMENTS

CN 103365339 A 10/2013
CN 103474003 A 12/2013
(Continued)

OTHER PUBLICATIONS

Foreign Communication From A Counterpart Application, European Application No. 17840733.4, Extended European Search Report dated Apr. 4, 2019, 11 pages.
(Continued)

*Primary Examiner* — Kwin Xie
(74) *Attorney, Agent, or Firm* — Conley Rose, P.C.

(57) ABSTRACT

A display apparatus includes a controller, and further includes a transparent display screen, a mode adjustment panel and a main display screen arranged in a stacking manner. The main display screen is configured to display a first application interface. The transparent display screen is configured to display a second application interface. The first application interface could be superimposed with the second application interface. A display method and a graphical user interface (GUI) that are corresponding to the display apparatus are also provided in this application.

20 Claims, 8 Drawing Sheets

(51) Int. Cl.
*G09G 5/377* (2006.01)
*G06F 3/147* (2006.01)
*G06F 3/0488* (2013.01)
*G06F 3/0484* (2013.01)
*G06F 3/041* (2006.01)
*G06F 3/044* (2006.01)

(52) U.S. Cl.
CPC .............. *G09G 3/20* (2013.01); *G09G 5/377* (2013.01); *G06F 3/044* (2013.01); *G06F 3/04142* (2019.05); *G06F 2203/04804* (2013.01); *G09G 2300/023* (2013.01); *G09G 2340/10* (2013.01); *G09G 2354/00* (2013.01)

(58) Field of Classification Search
USPC .................................................. 345/173–174
See application file for complete search history.

(56) References Cited

U.S. PATENT DOCUMENTS

| | | |
|---|---|---|
| 2013/0083040 A1 | 4/2013 | Prociw |
| 2013/0104061 A1 | 4/2013 | Engel et al. |
| 2013/0335656 A1 | 12/2013 | Liu |
| 2014/0062839 A1 | 3/2014 | Dominici et al. |
| 2016/0379603 A1 | 12/2016 | Zhu et al. |
| 2017/0041598 A1* | 2/2017 | Smithwick ............. G09G 3/003 |
| 2017/0310956 A1* | 10/2017 | Perdices-Gonzalez ...................... G02B 30/27 |

FOREIGN PATENT DOCUMENTS

| | | |
|---|---|---|
| CN | 103970422 A | 8/2014 |
| CN | 104063114 A | 9/2014 |
| CN | 204066065 U | 12/2014 |
| CN | 105100444 A | 11/2015 |
| CN | 105824693 A | 8/2016 |
| CN | 106325802 A | 1/2017 |

OTHER PUBLICATIONS

Machine Translation and Abstract of Chinese Publication No. CN103474003, Dec. 25, 2013, 5 pages.
Machine Translation and Abstract of Chinese Publication No. CN103970422, Aug. 6, 2014, 15 pages.
Machine Translation and Abstract of Chinese Publication No. CN104063114, Sep. 24, 2014, 21 pages.
Machine Translation and Abstract of Chinese Publication No. CN105824693, Aug. 3, 2016, 26 pages.
Machine Translation and Abstract of Chinese Publication No. CN106325802, Jan. 11, 2017, 52 pages.
Machine Translation and Abstract of Chinese Publication No. CN204066065, Dec. 31, 2014, 16 pages.
Foreign Communication From A Counterpart Application, PCT Application No. PCT/CN2017/076508, English Translation of International Search Report dated May 31, 2017, 2 pages.

* cited by examiner

DISPLAY METHOD, DISPLAY APPARATUS, AND GRAPHICAL USER INTERFACE

CROSS-REFERENCE TO RELATED APPLICATIONS

This application is a continuation of International Patent Application No. PCT/CN2017/076508 filed on Mar. 13, 2017, which claims priority to Chinese Patent Application No. 201610674971.3 filed on Aug. 16, 2016. The disclosures of the aforementioned applications are hereby incorporated by reference in their entireties.

TECHNICAL FIELD

Embodiments of the present disclosure relate to the field of electronic technologies, and in particular, to a display method, a display apparatus, and a graphical user interface (GUI).

BACKGROUND

With continuous development of electronic communication and computing technologies, portable electronic products develop rapidly. A common portable electronic product is an intelligent terminal, and different application programs (also referred to as APP) are installed on the intelligent terminal to implement various functions.

Currently, when the intelligent terminal displays an interface 1 (which is referred to as an application interface below) of an APP, if an application interface 2 needs to be simultaneously displayed, the intelligent terminal first determines whether a preset condition for displaying the application interface 2 in a transparent manner is met. If the preset condition is met, the intelligent terminal superimposes the application interface 2 on the application interface 1 and displays the application interface 2 in a transparent manner such that the application interface 2 can be simultaneously displayed without interrupting the application interface 1.

In the foregoing manner of superimposed display of the application interface 1 and the application interface 2 on the intelligent terminal, if much content is displayed in the application interface 1 (for example, content is displayed in all parts of the application interface 1), most of the content is text, and much content is also displayed in the application interface 2 (for example, most of the content in the application interface 2 is text, too), the content of the application interface 1 and the content of the application interface 2 are displayed in a mixed manner. Consequently, a poor display effect of the intelligent terminal is caused. Therefore, the foregoing solution increases a risk of a poor display effect of an intelligent terminal.

SUMMARY

This application provides a display method, a display apparatus, and a GUI to produce a better superimposed display effect of two application interfaces in order to reduce a risk of a poor display effect of an intelligent terminal.

To achieve the foregoing objective, this application uses the following technical solutions.

According to a first aspect, a display apparatus is provided, and the display apparatus includes a controller, and includes a transparent display screen, a mode adjustment panel, and a main display screen that are arranged in a stacking manner. The mode adjustment panel is located between the transparent display screen and the main display screen.

The main display screen is configured to display a first application interface. The transparent display screen is configured to display a second application interface. The controller is configured to determine, based on a first interaction region in the second application interface, a first shielding region that is on the mode adjustment panel and that is used to shield a part of the first application interface, and control the mode adjustment panel to display the first shielding region at preset transparency less than or equal to 85% such that the part of the first application interface is displayed at the preset transparency and superimposed with the first interaction region.

According to the display apparatus provided in this application, when two application interfaces (for example, the first application interface and the second application interface) need to be simultaneously displayed, the corresponding application interfaces may be respectively displayed using the main display screen and the transparent display screen (for example, the main display screen displays the first application interface, and the transparent display screen displays the second application interface), the first shielding region may be determined on the mode adjustment panel, and the first shielding region may be displayed at the preset transparency (for example, transparency less than or equal to 85%) on the mode adjustment panel. The first shielding region is used to shield the part of the first application interface such that the part of the first application interface is displayed at the preset transparency and superimposed with the first interaction region. Therefore, not only the two application interfaces can be simultaneously displayed, but also a better superimposed display effect of the two application interfaces can be ensured. Compared with other approaches, the display apparatus provided in this application cannot only produce a better superimposed display effect of two application interfaces, but also reduce a risk of a poor display effect of the display apparatus.

In a first optional implementation of the first aspect, the controller is further configured to control the mode adjustment panel to display a first non-shielding region at second transparency greater than first transparency such that the other part of the first application interface, different from the part of the first application interface, is displayed at the second transparency and superimposed with a region other than the first interaction region in the second application interface. The first non-shielding region is a region other than the first shielding region on the mode adjustment panel.

According to the display apparatus provided in this application, the part of the first application interface can be shielded by the first shielding region such that the part of the first application interface is displayed at the first transparency and superimposed with the first interaction region in the second application interface. Content in the first non-shielding region is normally displayed such that the other part of the first application interface, different from the part of the first application interface, is displayed at the second transparency and superimposed with the region other than the first interaction region in the second application interface. It can be ensured that a user operation is not interfered only in the first interaction region of the second application interface, and the first application interface and the second application interface can still be normally superimposed for displaying in another region. In this way, a better superimposed display effect of the two application interfaces can be produced.

Further, the user cannot only simultaneously view the two application interfaces, but also perform an operation on the first interaction region in the second application interface without impact from the first application interface displayed on the bottom main display screen, thereby improving user experience.

For example, the first transparency may be 0%, and the second transparency may be 30%. In this way, it can be ensured that the first shielding region completely shields a region (the part of the first application interface) that is in the first application interface and that is corresponding to the first shielding region, and that the first non-shielding region may shield, in a translucent manner, a region (the other part of the first application interface, different from the part of the first application interface) that is in the first application interface and that is corresponding to the first non-shielding region.

In a second optional implementation of the first aspect, the controller is further configured to obtain characteristic data of the first interaction region, and determine the first shielding region based on the characteristic data of the first interaction region.

In a third optional implementation of the first aspect, the display apparatus in this application further includes a touchscreen. The transparent display screen and the touchscreen may be two independent components, or may be an integrated component. The following provides description using an example in which the transparent display screen and the touchscreen are an integrated component, for example, the integrated component is a transparent touchscreen.

In a fourth optional implementation of the first aspect, the controller is further configured to obtain a touch display operation that is detected by the transparent touchscreen and that is used to trigger the display apparatus to determine the first interaction region in the second application interface, and determine the first interaction region in the second application interface based on the touch display operation. In this way, when no first interaction region is displayed in the second application interface initially displayed on the transparent touchscreen, a user may trigger a corresponding touch display operation such that the first interaction region appears on the second application interface, to implement a control procedure in this embodiment of the present disclosure.

In a fifth optional implementation of the first aspect, the controller is further configured to obtain a first touch operation that is detected by the transparent touchscreen and that is used to trigger the display apparatus to display the first application interface, control, based on the first touch operation, the main display screen to display the first application interface, obtain a second touch operation that is detected by the transparent touchscreen and that is used to trigger the display apparatus to display the second application interface, and control, based on the second touch operation, the transparent touchscreen to display the second application interface.

The first touch operation may be that a user taps an icon of a first application (an interface of the first application is the first application interface in this application) in an initial interface of the display apparatus. The second touch operation may be that the user taps an icon of a second application (an interface of the second application is the second application interface in this application) in the initial interface of the display apparatus.

The initial interface of the display apparatus is a main display interface of the display apparatus, a display interface that is of the display apparatus (further, the main display screen or the transparent touchscreen of the display apparatus) and on which a plurality of application icons are displayed. The application interface is a display interface of the display apparatus when an application runs in the foreground of the display apparatus. For example, the first application interface is a display interface of the display apparatus when the first application runs in the foreground of the display apparatus, and the second application interface is a display interface of the display apparatus when the second application runs in the foreground of the display apparatus.

In this application, when the main display screen displays an application interface and the transparent touchscreen displays an application interface, the display apparatus usually can respond to only a user operation on the application interface (a top application interface, for example, the second application interface) displayed on the transparent touchscreen. A user may view the application interface (a bottom application interface, for example, the first application interface) displayed on the main display screen, but cannot perform an operation on the application interface displayed on the main display screen.

Therefore, in a sixth optional implementation of the first aspect, this application provides two methods to respond to not only a user operation on the first application interface displayed on the main display screen, but also a user operation on the second application interface displayed on the transparent touchscreen.

In a first method, the controller is further configured to, when the main display screen displays the first application interface and the transparent touchscreen displays the second application interface, obtain a touch operation (to distinguish between different touch operations in this application, the touch operation herein is referred to as a third touch operation below) that is detected by the transparent touchscreen and that is used to trigger the display apparatus to exchange and display the first application interface and the second application interface, control, based on the third touch operation, the main display screen to display the second application interface, and control, based on the third touch operation, the transparent touchscreen to display the first application interface, determine, based on a second interaction region in the first application interface, a second shielding region that is on the mode adjustment panel and that is used to shield a part of the second application interface, and control the mode adjustment panel to display the second shielding region at the preset transparency (the first transparency) such that the part of the second application interface is displayed at the preset transparency and superimposed with the second interaction region.

The controller may further control the mode adjustment panel to display a second non-transparent region at the second transparency. The second non-shielding region is a region other than the second shielding region on the mode adjustment panel. In this way, the other part of the second application interface, different from the part of the second application interface, is displayed at the second transparency and superimposed with a region other than the second interaction region in the first application interface.

Therefore, in this application, when a user needs to perform an operation on the first application interface displayed on the main display screen, the first application interface displayed on the main display screen and the second application interface displayed on the transparent touchscreen may be exchanged and displayed such that the first application interface originally displayed on the main display screen is displayed on the transparent touchscreen, and the second application interface originally displayed on the transparent touchscreen is displayed on the main display screen. The original bottom application interface is switched to the top application interface, and the original top application interface is switched to the bottom application interface. Therefore, the user can directly perform an operation on the top application interface.

In this application, the third touch operation may be defined as one of the following three possible implementations.

(1). The third touch operation may be defined as pressing a "Home" button to return to the initial interface, and then selecting and activating a corresponding icon of an application to enable the application in order to switch and display two application interfaces. An application interface of the application is displayed on the transparent touchscreen, and an application interface of an application that is enabled before the application is enabled is displayed on the main display screen.

(2). The third touch operation may be defined as a predetermined gesture, to switch and display two application interfaces. An application interface displayed on the main display screen before switching is displayed on the transparent touchscreen after switching, and an application interface displayed on the transparent touchscreen before switching is displayed on the main display screen after switching.

(3). The third touch operation may be defined as a predetermined path, to switch and display two application interfaces. An application interface displayed on the main display screen before switching is displayed on the transparent touchscreen after switching, and an application interface displayed on the transparent touchscreen before switching is displayed on the main display screen after switching.

In the first method, the first application interface displayed on the main display screen and the second application interface displayed on the transparent touchscreen may be exchanged and displayed using different third touch operations. Therefore, not only a user operation on the first application interface displayed on the main display screen, but also a user operation on the second application interface displayed on the transparent touchscreen is responded to.

In a second method, pressure applied when a user performs a touch operation on the transparent touchscreen may be detected. When the pressure is greater than a preset threshold, a user operation on the first application interface displayed on the main display screen is responded to. When the pressure is less than or equal to the preset threshold, a user operation on the second application interface displayed on the transparent touchscreen is responded to.

In an implementation, a pressure detection component may be disposed under the main display screen, and the pressure detection component detects the pressure applied when the user performs the touch operation on the transparent touchscreen. Then, the display apparatus determines, based on the pressure and a location that is detected by the transparent touchscreen and at which the user performs the touch operation to respond to a user operation on an application interface displayed on a specific display screen (the main display screen or the transparent touchscreen).

The pressure detection component may include at least three pressure sensors and a pressure drive circuit. Further, the pressure sensors may be disposed around the display apparatus.

In another implementation, a capacitance change that is between the transparent touchscreen and a baseboard reference surface and that is caused by the user touch operation on the transparent touchscreen may be detected using the transparent touchscreen, and the pressure applied when the user performs the touch operation on the transparent touchscreen is calculated based on the capacitance change. Then, the display apparatus determines, based on the pressure and a location that is detected by the transparent touchscreen and at which the user performs the touch operation, to respond to a user operation on an application interface displayed on a specific display screen (the main display screen or the transparent touchscreen).

In the two implementations shown in the second method, the display apparatus may determine, based on the pressure applied when the user performs the touch operation on the transparent touchscreen and the location at which the user performs the touch operation to respond to the user operation on the application interface displayed on the specific display screen (the main display screen or the transparent touchscreen). For example, if the pressure is relatively large (for example, greater than the preset threshold), the display apparatus determines to respond to the user operation on the application interface (the first application interface) displayed on the main display screen. The display apparatus switches the user operation to the application interface displayed on the main display screen, and the display apparatus responds to the user operation on the application interface displayed on the main display screen. If the pressure is relatively small (for example, less than or equal to the preset threshold), the display apparatus determines to respond to the user operation on the application interface (the second application interface) displayed on the transparent touchscreen. The display apparatus keeps the user operation on the application interface displayed on the transparent touchscreen, and the display apparatus responds to the user operation on the application interface displayed on the transparent touchscreen.

According to the two methods (the first method and the second method), both a touch operation on the application interface (the first application interface) displayed on the main display screen and a touch operation on the application interface (the second application interface) displayed on the transparent touchscreen can be implemented.

In a seventh optional implementation of the first aspect, the display apparatus in this application may further include a main display drive circuit that is configured to drive the main display screen, a mode adjustment drive circuit that is configured to drive the mode adjustment panel, and a transparent display drive circuit that is configured to drive the transparent display screen (or the transparent touchscreen).

The controller is further configured to drive, using the main display drive circuit, the main display screen to display, drive, using the transparent display drive circuit, the transparent display screen (or the transparent touchscreen) to display, and drive, using the mode adjustment drive circuit, the mode adjustment panel to display.

If the display apparatus in this application is a smartwatch, in a possible implementation, the first application interface may be a date and/or time interface displayed on the main display screen, or an application interface that includes the date and/or time interface.

In another possible implementation, the main display screen may be a mechanical dial of the smartwatch, and the first application interface may be a date and/or time interface displayed on the mechanical dial.

The mode adjustment panel may be implemented using an electrochromic panel.

According to the display apparatus provided in this application, using a characteristic that the electrochromic panel may present different transparency when different drive voltages are applied to the electrochromic panel, not only two application interfaces can be simultaneously displayed, but also a better superimposed display effect of the two application interfaces can be ensured, thereby reducing a risk of a poor display effect of an intelligent terminal.

In an eighth optional implementation of the first aspect, when the display apparatus in this application is in a lock screen state, to save power of the display apparatus and extend a standby time of the display apparatus, the display apparatus may disable the main display screen, the transparent display screen, and the touchscreen (or the transparent touchscreen that integrates the transparent display screen and the touchscreen), activate the mode adjustment panel, and control the mode adjustment panel to display common static information, for example, control the mode adjustment panel to display weather information, date information, or the like.

According to a second aspect, a display method is provided, and the display method is applied to a display apparatus. The display apparatus includes a transparent display screen, a mode adjustment panel, and a main display screen that are arranged in a stacking manner. The mode adjustment panel is located between the transparent display screen and the main display screen. The display method includes controlling the main display screen to display a first application interface, controlling the transparent display screen to display a second application interface, determining, based on a first interaction region in the second application interface, a first shielding region that is on the mode adjustment panel and that is used to shield a part of the first application interface, and controlling the mode adjustment panel to display the first shielding region at preset transparency less than or equal to 85% such that the part of the first application interface is displayed at the preset transparency and superimposed with the first interaction region.

In a first optional implementation of the second aspect, the display method provided in this application further includes controlling the mode adjustment panel to display a first non-shielding region at second transparency greater than first transparency such that the other part of the first application interface, different from the part of the first application interface, is displayed at the second transparency and superimposed with a region other than the first interaction region in the second application interface. The first non-shielding region is a region other than the first shielding region on the mode adjustment panel.

In a second optional implementation of the second aspect, the method for determining, based on a first interaction region in the second application interface, a first shielding region that is on the mode adjustment panel and that is used to shield a part of the first application interface may include obtaining characteristic data of the first interaction region, and determining the first shielding region based on the characteristic data of the first interaction region.

In a third optional implementation of the second aspect, the display method in this application further includes obtaining a touch display operation that is used to trigger the display apparatus to determine the first interaction region in the second application interface, and determining the first interaction region in the second application interface based on the touch display operation.

In a fourth optional implementation of the second aspect, the display method in this application further includes obtaining a first touch operation that is used to trigger the display apparatus to display the first application interface, controlling, based on the first touch operation, the main display screen to display the first application interface, obtaining a second touch operation that is used to trigger the display apparatus to display the second application interface, and controlling, based on the second touch operation, the transparent display screen to display the second application interface.

In a fifth optional implementation of the second aspect, the display method in this application further includes obtaining a touch operation (to distinguish between different touch operations in this application when the main display screen displays the first application interface and the transparent display screen displays the second application interface, the touch operation herein is referred to as a third touch operation below) that is used to trigger the display apparatus to exchange and display the first application interface and the second application interface, controlling, based on the third touch operation, the main display screen to display the second application interface, and controlling, based on the third touch operation, the transparent display screen to display the first application interface, determining, based on a second interaction region in the first application interface, a second shielding region that is on the mode adjustment panel and that is used to shield a part of the second application interface, and controlling the mode adjustment panel to display the second shielding region at the preset transparency such that the part of the second application interface is displayed at the preset transparency (the first transparency) and superimposed with the second interaction region.

The display method in this application further includes controlling the mode adjustment panel to display a second non-shielding region at the second transparency such that the other part of the second application interface, different from the part of the second application interface, is displayed at the second transparency and superimposed with a region other than the second interaction region in the first application interface. The second non-shielding region is a region other than the second shielding region on the mode adjustment panel.

For details of technical effects of the second aspect and the various optional implementations of the second aspect, refer to related descriptions of technical effects of the first aspect and the various optional implementations of the first aspect. Details are not described herein again.

According to a third aspect, a GUI on a display apparatus is provided. The display apparatus includes a transparent display screen, a mode adjustment panel, and a main display screen that are arranged in a stacking manner. The mode adjustment panel is located between the transparent display screen and the main display screen. The GUI includes a first application interface, a second application interface, and a first shielding region. A part of the first application interface is shielded by the first shielding region, the second application interface includes a first interaction region, and the first shielding region is displayed at preset transparency such that the part of the first application interface is displayed at the preset transparency and superimposed with the first interaction region. The preset transparency is less than or equal to 85%.

In response to a detected trigger for a first application from a user, the first application interface (an interface of the first application) is displayed on the main display screen. In response to a detected trigger for a second application from the user, the second application interface (an interface of the second application) is displayed on the transparent display screen, and the first shielding region is displayed at the preset transparency on the mode adjustment panel.

In a first optional implementation of the third aspect, the GUI provided in this application further includes a first non-shielding region. The first non-shielding region is displayed at second transparency. The other part of the first application interface, different from the part of the first application interface, is displayed at the second transparency and superimposed with a region other than the first interaction region in the second application interface. The first non-shielding region is a region other than the first shielding region on the mode adjustment panel. The second transparency is greater than first transparency.

In response to the detected trigger for the second application from the user, the first non-shielding region is displayed at the second transparency on the mode adjustment panel.

In a second optional implementation of the third aspect, the transparent display screen in the display apparatus in this application is further a transparent touchscreen (the transparent display screen is a component that integrates a display function and a touch function). The first application is triggered when the transparent touchscreen detects a first touch operation of the user, and the second application is triggered when the transparent touchscreen detects a second touch operation of the user.

In a third optional implementation of the third aspect, in the GUI provided in this application, the first interaction region in the second application interface is determined when the transparent touchscreen detects a touch display operation.

In a fourth optional implementation of the third aspect, the first application interface and the second application interface in the GUI are exchanged and displayed, the first shielding region is switched to a second shielding region, a part of the second application interface is shielded by the second shielding region, the first application interface includes a second interaction region, and the second shielding region is displayed at the preset transparency such that the part of the second application interface is displayed at the preset transparency and superimposed with the second interaction region.

In response to a user touch operation (the third touch operation) detected by the transparent touchscreen, the second application interface is displayed on the main display screen, the first application interface is displayed on the transparent touchscreen, and the second shielding region is displayed at the preset transparency on the mode adjustment panel.

For details of technical effects of the third aspect and the various optional implementations of the third aspect, refer to related descriptions of technical effects of the first aspect and the various optional implementations of the first aspect. Details are not described herein again.

In one case according to the first aspect to the third aspect, the characteristic data of the first interaction region in this application includes a location of the first interaction region on the second application interface and an area of the first interaction region.

The location of the first interaction region on the second application interface is used to determine a projection of the first interaction region on the mode adjustment panel in a direction perpendicular to the mode adjustment panel. The projection of the first interaction region on the mode adjustment panel in the direction perpendicular to the mode adjustment panel falls within the first shielding region, and an area of the first shielding region is greater than or equal to the area of the first interaction region.

Further, the characteristic data of the first interaction region in this application may further include any other data that can describe a characteristic of the first interaction region, for example, an angle of rotation of the first interaction region in the second application interface, a shape of the first interaction region, or a color of the first interaction region.

The first interaction region in this application includes any other region that is in the display interface and that can implement human computer interaction, for example, a text input box, a virtual operation button, a slider bar, a drop-down menu, a check box, and the like.

In another case according to the first aspect to the third aspect, a projection of the first shielding region on the main display screen in a direction perpendicular to the main display screen is completely overlapped with the part of the first application interface. In this way, it can be ensured that the first shielding region can completely shield the part of the first application interface such that a user can perform an operation on the first interaction region without interference and impact from the part of the first application interface.

According to a fourth aspect, an intelligent terminal is provided, and the intelligent terminal includes the display apparatus according to any one of first aspect or the various optional implementations of the first aspect.

According to a fifth aspect, an intelligent terminal is provided, and the intelligent terminal includes a processor, a communication module, an input/output interface, a storage module, a graphics processing unit, a main display screen, a main display drive circuit that is configured to drive the main display screen, a mode adjustment panel, a mode adjustment drive circuit that is configured to drive the mode adjustment panel, a transparent touchscreen, and a transparent display drive circuit that is configured to drive the transparent touchscreen (an example in which a transparent display screen and a touchscreen are an integrated component is used for description in this application).

According to a sixth aspect, a computer-readable storage medium is provided. The computer-readable storage medium stores one or more programs. The one or more programs include a computer executable instruction. When a processor of an intelligent terminal executes the computer executable instruction, the intelligent terminal performs the display method according to any one of the second aspect or the various optional implementations of the second aspect. For the specific display method, refer to related descriptions in the second aspect and the various optional implementations of the second aspect. Details are not described herein again.

For details of technical effects of the fourth aspect to the sixth aspect, refer to related descriptions of technical effects of the first aspect and the various optional implementations of the first aspect. Details are not described herein again.

DESCRIPTION OF EMBODIMENTS

Figure 1:
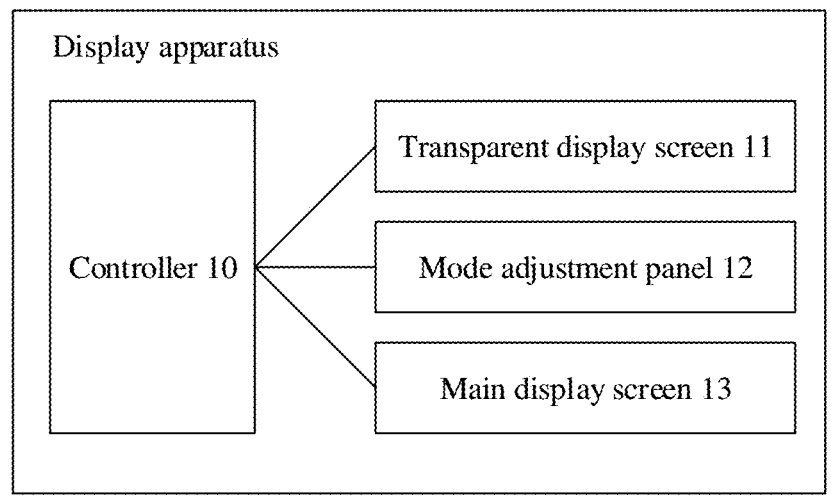
FIG. 1 is a schematic structural diagram of a display apparatus according to an embodiment of the present disclosure.

The term "and/or" in this specification describes only an association relationship for describing associated objects and represents that three relationships may exist. For example, A and/or B may represent the following three cases, only A exists, both A and B exist, and only B exists. In this specification, a symbol "/" indicates an "or" relationship between associated objects, for example, A/B indicates A or B.

In the specification and claims in the embodiments of the present disclosure, the terms "first," "second," "third," and so on are intended to distinguish between different objects but do not indicate a particular order of the objects. For example, a first application interface and a second application interface are intended to distinguish between different application interfaces but do not indicate a particular order of the application interfaces. For another example, a first touch operation, a second touch operation, and a third touch operation are intended to distinguish between different touch operations but do not indicate a particular order of the touch operations.

In the embodiments of the present disclosure, the word such as "example" or "for example" is used to represent giving an example, an illustration, or a description. Any embodiment or design solution described as an "example" in the embodiments of the present disclosure should not be explained as being more preferred or having more advantages than another embodiment or design solution. Exactly, use of the word such as "example" or "for example" is intended to present a related concept in a specific manner.

In descriptions of the embodiments of the present disclosure, unless otherwise provided, "a plurality of" means two or more than two. For example, a plurality of application interfaces are two or more application interfaces, and a plurality of chips are two or more chips.

The following describes in detail the technical solutions in the embodiments of the present disclosure with reference to the accompanying drawings in the embodiments of the present disclosure. The described embodiments are merely some but not all of the embodiments of the present disclosure.

A display method, a display apparatus, and a GUI provided in the embodiments of the present disclosure may be applied to an intelligent terminal. The intelligent terminal may be a smartphone, or may be a smartwatch (the smartwatch may be a wearable smartwatch), or may be any one or a combination of a fixed device, a mobile device, a consumer device, a computer device, a portable device, a user communications device, a telephone device, a navigation device, a television device, a game device, a media playback device, or an electronic device that meets a use requirement. Certainly, in addition to the foregoing hardware devices, the intelligent terminal may be a logical device associated with a user and/or an entity operating the intelligent terminal. For example, the logical device may be any one or a combination of a user, software, firmware, hardware, or a device.

The display method provided in the embodiments of the present disclosure may be performed by a display apparatus. The display apparatus may be the foregoing intelligent terminal, or may be a function module that is in the foregoing intelligent terminal and that can implement the display method provided in the embodiments of the present disclosure, or may be a function module that is independent of the intelligent terminal and that can implement the display method provided in the embodiments of the present disclosure. This is not further limited in the embodiments of the present disclosure.

As shown in FIG. 1, an embodiment of the present disclosure provides a display apparatus. The display apparatus may include a controller 10, and include a transparent display screen 11, a mode adjustment panel 12, and a main display screen 13 that are arranged in a stacking manner. The mode adjustment panel 12 is located between the transparent display screen 11 and the main display screen 13.

The main display screen 13 is configured to display a first application interface. The transparent display screen 11 is configured to display a second application interface. The controller 10 is configured to determine a first shielding region on the mode adjustment panel 12 based on a first interaction region in the second application interface, and control the mode adjustment panel 12 to display the first shielding region at preset transparency. The first shielding region is used to shield a part of the first application interface such that the part of the first application interface is displayed at the preset transparency and superimposed with the first interaction region. The preset transparency is less than or equal to 85%.

To distinguish between different transparency, the preset transparency is referred to as first transparency in the following embodiments. A description of the first transparency and a description of the preset transparency may be exchanged in the embodiments of the present disclosure.

In this embodiment of the present disclosure, a stacking location relationship between the main display screen 13, the mode adjustment panel 12, and the transparent display screen 11 is described using, for example, distances between the components and a user when a front of the display apparatus faces the user. When the front of the display apparatus faces the user, in ascending order of the distances between the components and the user, an arrangement order of the components is the transparent display screen 11, the mode adjustment panel 12, and the main display screen 13.

Optionally, in the display apparatus provided in this embodiment of the present disclosure, the main display screen 13, the mode adjustment panel 12, and the transparent display screen 11 may be arranged in an overlapping manner. The main display screen 13, the mode adjustment panel 12, and the transparent display screen 11 are stacked layer by layer. The mode adjustment panel 12 covers the main display screen 13, and the transparent display screen 11 covers the mode adjustment panel 12.

According to the display apparatus provided in this embodiment of the present disclosure, when two application interfaces (for example, the first application interface and the second application interface) need to be simultaneously displayed, the corresponding application interfaces may be respectively displayed using the main display screen and the transparent display screen (for example, the main display screen displays the first application interface, and the transparent display screen displays the second application interface), the first shielding region may be determined on the mode adjustment panel, and the first shielding region may be displayed at the preset transparency (for example, transparency less than or equal to 85%) on the mode adjustment panel. The first shielding region is used to shield the part of the first application interface such that the part of the first application interface is displayed at the preset transparency and superimposed with the first interaction region. Therefore, not only the two application interfaces can be simultaneously displayed, but also a better superimposed display effect of the two application interfaces can be ensured. Compared with the other approaches, the display apparatus provided in this embodiment of the present disclosure cannot only produce a better superimposed display effect of two application interfaces, but also reduce a risk of a poor display effect of the display apparatus.

Optionally, in the display apparatus provided in this embodiment of the present disclosure, the controller 10 is further configured to control the mode adjustment panel 12 to display a first non-shielding region at second transparency such that the other part of the first application interface, different from the part of the first application interface, is displayed at the second transparency and superimposed with a region other than the first interaction region in the second application interface. The first non-shielding region is a region other than the first shielding region on the mode adjustment panel 12. The second transparency is greater than the first transparency.

In this embodiment of the present disclosure, the first application interface is displayed on the main display screen 13, the first shielding region and the first non-shielding region are displayed on the mode adjustment panel 12, and the second application interface is displayed on the transparent display screen 11. It may be determined, based on the description of the stacking location relationship between the transparent display screen 11, the mode adjustment panel 12, and the main display screen 13, that the second application interface is an application interface closest to the user, and the second application interface may also be referred to as a top application interface, that the first application interface is an application interface farthest away from the user, and the first application interface may also be referred to as a bottom application interface, and that a display interface in which the first shielding region and the first non-shielding region are located is a display interface between the top application interface and the bottom application interface.

Figure 2:
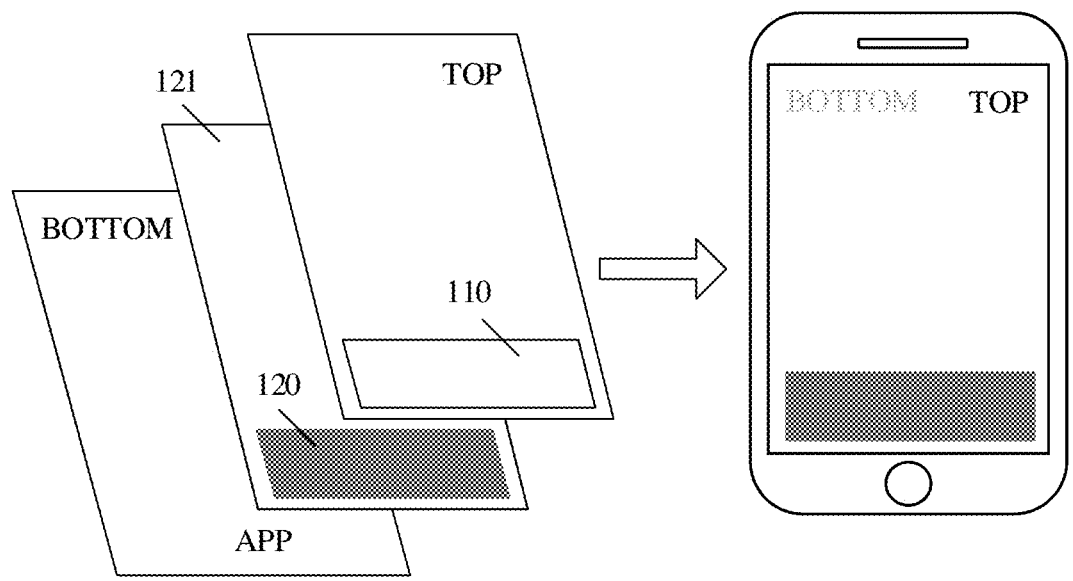
FIG. 2 is a schematic display diagram of a display apparatus according to an embodiment of the present disclosure.

For example, FIG. 2 is a schematic display diagram of a display apparatus according to an embodiment of the present disclosure. Left image of FIG. 2 is a schematic diagram of a main display screen, a transparent display screen, and a mode adjustment panel that are separately displayed. Right image of FIG. 2 is a schematic diagram of a main display screen, a transparent display screen, and a mode adjustment panel that are displayed in a superimposed manner. As shown in FIG. 2, content of a first application interface displayed on the main display screen is "BOTTOM" and "APP", content of a second application interface displayed on the transparent display screen is "TOP", the second application interface includes a first interaction region 110, and the mode adjustment panel displays a first shielding region 120 and a first non-shielding region 121. Transparency (second transparency) of the first non-shielding region 121 is greater than transparency (first transparency) of the first shielding region 120. The transparency of the first shielding region 120 is less than the transparency (the second transparency) of the first non-shielding region 121. As shown in FIG. 2, after the main display screen, the transparent display screen, and the mode adjustment panel are superimposed for displaying, the display apparatus may still present "BOTTOM" in the first application interface displayed on the main display screen. However, because of blocking of the first shielding region 120, the display apparatus does not present "APP" in the first application interface displayed on the main display screen. In addition, due to impact of the transparency of the first non-shielding region 121, the "BOTTOM" presented on the display apparatus may be gray to some extent. Therefore, in the display apparatus, a part of the first application interface can be shielded by the first shielding region 120 such that the part of the first application interface is displayed at the first transparency and superimposed with the first interaction region 110 in the second application interface. Content in the first non-shielding region 121 is normally displayed such that the other part of the first application interface, different from the part of the first application interface, is displayed at the second transparency and superimposed with a region other than the first interaction region 110 in the second application interface. It can be ensured that a user operation is not interfered only in the first interaction region 110 of the second application interface, and the first application interface and the second application interface can still be normally superimposed for displaying in another region. In this way, a better superimposed display effect of the two application interfaces can be produced. Further, a user cannot only simultaneously view the two application interfaces, but also perform an operation on the first interaction region in the second application interface without impact from the first application interface displayed on the bottom main display screen, thereby improving user experience.

For example, the first transparency may be 0%, and the second transparency may be 30%. In this way, it can be ensured that the first shielding region completely shields a region (the part of the first application interface) that is in the first application interface and that is corresponding to the first shielding region 120, and that the first non-shielding region 121 may shield, in a translucent manner, a region (the other part of the first application interface, different from the part of the first application interface) that is in the first application interface and that is corresponding to the first non-shielding region 121.

Optionally, in actual implementation, the first transparency and the second transparency may be set by a user in user preference in an operating system (which may be an operating system of an intelligent terminal to which the display apparatus is applied) of the display apparatus, or may be determined by the display apparatus based on a display parameter (for example, a color difference between the first interaction region and the other region in the second application interface, or a brightness difference between the first interaction region and the other region) of the second application interface. This is not limited in this embodiment of the present disclosure.

Optionally, in the display apparatus provided in this embodiment of the present disclosure, that the controller determines the first shielding region 120 on the mode adjustment panel based on the first interaction region 110 in the second application interface may include that the controller is further configured to obtain characteristic data of the first interaction region 110, and determine the first shielding region 120 based on the characteristic data of the first interaction region 110.

Optionally, the characteristic data of the first interaction region 110 includes a location of the first interaction region 110 on the second application interface and an area of the first interaction region 110.

The location of the first interaction region 110 on the second application interface is used to determine a projection of the first interaction region 110 on the mode adjustment panel in a direction perpendicular to the mode adjustment panel. The projection of the first interaction region 110 on the mode adjustment panel in the direction perpendicular to the mode adjustment panel falls within the first shielding region 120. An area of the first shielding region 120 is greater than or equal to the area of the first interaction region 110.

For example, as shown in FIG. 2, the projection of the first interaction region 110 on the mode adjustment panel in the direction perpendicular to the mode adjustment panel is completely overlapped with the first shielding region 120. An area of the first shielding region 120 is equal to an area of the first interaction region 110. Certainly, in an embodiment, the area of the first shielding region 120 may be greater than the area of the first interaction region 110. Further, the area may be determined based on an actual use requirement. This is not limited in this embodiment of the present disclosure.

Optionally, in this embodiment of the present disclosure, the characteristic data of the first interaction region 110 may further include any other data that can describe a characteristic of the first interaction region 110, for example, an angle of rotation of the first interaction region 110 in the second application interface, a shape of the first interaction region 110, or a color of the first interaction region 110.

Optionally, in this embodiment of the present disclosure, the first interaction region 110 includes but is not limited to a text input box, a virtual operation button, a slider bar, a drop-down menu, a check box, and the like. Further, the first interaction region 110 may be determined based on an actual use requirement. This is not limited in this embodiment of the present disclosure.

For example, the second application interface is a web page application interface. The first interaction region 110 may be a website input box. The characteristic data of the first interaction region 110 may include but is not limited to a location of the website input box in the web page application interface and an area of the website input box (for example, a height and a width of the website input box). The characteristic data of the first interaction region 110 may further include an angle of rotation of the website input box in the web page application interface, a shape of the website input box, a color of the website input box, and the like. In this embodiment of the present disclosure, the controller may obtain the characteristic data of the website input box by directly reading data of a Hypertext Markup Language (HTML) web page structure of the website input box. For example, the data of the HTML web page structure may be a frameset parameter or a table parameter in a description of the HTML web page structure.

Further, it is assumed that the data that is of the HTML web page structure and that is read by the controller is as follows. The second application interface is a web page application interface whose resolution is 1024×768. The web page application interface includes a center-aligned rectangular website input box whose X offset is 0 pixel, Y offset is 924 pixels, height is 100 pixels, and width is 700 pixels. Then, the controller may determine, based on the data of the HTML web page structure, a projection of the first interaction region on the mode adjustment panel in a direction perpendicular to the mode adjustment panel, and determine a first shielding region on the mode adjustment panel based on the projection. The projection of the first interaction region on the mode adjustment panel in the direction perpendicular to the mode adjustment panel falls within the first shielding region, and an area of the first shielding region is equal to an area of the website input box. The first shielding region 120 and the first interaction region 110 shown in FIG. 2 are used as an example. The projection of the first interaction region 110 on the mode adjustment panel in the direction perpendicular to the mode adjustment panel falls within the first shielding region 120, and the area of the first shielding region 120 is equal to the area of the first interaction region 110.

Optionally, a projection of the first shielding region on the main display screen in a direction perpendicular to the main display screen is completely overlapped with the part of the first application interface. In this way, it can be ensured that the first shielding region can completely shield the part of the first application interface such that a user can perform an operation on the first interaction region without interference and impact from the part of the first application interface.

Optionally, the display apparatus provided in this embodiment of the present disclosure may further include a touchscreen. The transparent display screen and the touchscreen may be two independent components, or may be an integrated component. Further, the transparent display screen and the touchscreen may be designed based on an actual use requirement. This is not limited in this embodiment of the present disclosure.

When the transparent display screen and the touchscreen are two independent components, a separate touchscreen may be integrated into the transparent display screen. When the transparent display screen and the touchscreen are an integrated component, a display function and a touch function may be integrated. In this case, the transparent display screen in this embodiment of the present disclosure may also be referred to as a transparent touchscreen.

The following provides description using an example in which the transparent display screen and the touchscreen are an integrated component that integrates the display function and the touch function. The transparent display screen is the transparent touchscreen (when the transparent display screen and the touchscreen are an integrated component in the descriptions of the embodiments of the present disclosure, the transparent display screen and the transparent touchscreen may be interchanged).

It should be noted that, if the transparent display screen and the touchscreen are two independent components, a touch operation that is detected by the transparent touchscreen and that is described in the following embodiment may be further a touch operation detected by the touchscreen.

Optionally, in the display apparatus provided in this embodiment of the present disclosure, the controller is further configured to obtain a touch display operation detected by the transparent touchscreen, where the touch display operation is used to trigger the display apparatus to determine the first interaction region in the second application interface, and determine the first interaction region in the second application interface based on the touch display operation.

In this embodiment of the present disclosure, after the transparent touchscreen detects the touch display operation that is used to determine the first interaction region in the second application interface, the controller may determine the first interaction region in the second application interface (for example, a location of the first interaction region in the second application interface) based on the touch display operation. In this way, when no first interaction region is displayed in the second application interface initially displayed on the transparent touchscreen, a user may trigger a corresponding touch display operation such that the first interaction region appears on the second application interface, to implement a control procedure in this embodiment of the present disclosure.

Optionally, the touch display operation may be that a user performs a slide operation in the second application interface, or that a user taps at a corresponding location (for example, a notification message window displayed in the second application interface) in the second application interface. Further, the touch display operation may be determined based on an actual use requirement. This is not limited in this embodiment of the present disclosure.

Optionally, the controller is further configured to obtain a first touch operation detected by the transparent touchscreen, where the first touch operation is used to trigger the display apparatus to display the first application interface, control, based on the first touch operation, the main display screen to display the first application interface, obtain a second touch operation detected by the transparent touchscreen, where the second touch operation is used to trigger the display apparatus to display the second application interface, and control, based on the second touch operation, the transparent touchscreen to display the second application interface.

Further, in this embodiment of the present disclosure, before determining the first shielding region and the controlling the mode adjustment panel to display the first shielding region, the controller may control the main display screen to display the first application interface, and control the transparent touchscreen to display the second application interface.

Optionally, in this embodiment of the present disclosure, the first touch operation may be that a user taps an icon of a first application (an interface of the first application is the first application interface in this embodiment of the present disclosure) in an initial interface of the display apparatus. The second touch operation may be that the user taps a second application (an interface of the second application is the second application interface in this embodiment of the present disclosure) in the initial interface of the display apparatus. In a possible implementation, when the user taps the icon of the first application in the initial interface of the display apparatus, the controller responds to the user operation, to control the main display screen to display the first application interface. When the user presses a "Home" button, the controller responds to the operation, to control the main display screen to display the initial application interface. When the user taps the icon of the second application in the initial interface of the display apparatus, the controller responds to the user operation, to control the transparent touchscreen to display the second application interface, and control the main display screen to display the first application interface.

In another possible implementation, when a plurality of applications (for example, the first application and the second application) run in the background of the display apparatus, the controller controls the transparent touchscreen to display an interface (for example, the second application interface) of a last application enabled by a user, and controls the main display screen to display an interface (for example, the first application interface) of an application that is enabled before the first application is enabled. Further, if the user continues to enable a new application (for example, an interface of the new application is a third application interface), the controller controls the transparent touchscreen to display the third application interface, and controls the main display screen to display the second application interface.

It should be noted that, in this embodiment of the present disclosure, the initial interface of the display apparatus is a main display interface of the display apparatus, a display interface that is of the display apparatus (the main display screen or the transparent touchscreen of the display apparatus) and on which a plurality of application icons are displayed. The application interface is a display interface of the display apparatus when an application runs in the foreground of the display apparatus. For example, the first application interface is a display interface of the display apparatus when the first application runs in the foreground of the display apparatus, and the second application interface is a display interface of the display apparatus when the second application runs in the foreground of the display apparatus.

Optionally, in the display apparatus provided in this embodiment of the present disclosure, the controller is further configured to when the main display screen displays the first application interface and the transparent touchscreen displays the second application interface, obtain a touch operation (to distinguish between different touch operations in this embodiment of the present disclosure, the touch operation herein is referred to as a third touch operation below) detected by the transparent touchscreen, where the third touch operation is used to trigger the display apparatus to exchange and display the first application interface and the second application interface, control, based on the third touch operation, the main display screen to display the second application interface, and control, based on the third touch operation, the transparent touchscreen to display the first application interface, determine a second shielding region on the mode adjustment panel based on a second interaction region in the first application interface, and control the mode adjustment panel to display the second shielding region at the preset transparency (the first transparency). The second shielding region is used to shield a part of the second application interface such that the part of the second application interface is displayed at the preset transparency and superimposed with the second interaction region. In this embodiment, a method for determining the second shielding region is similar to the method for determining the first shielding region in the foregoing embodiment. For details, refer to related descriptions of the method for determining the first shielding region in the foregoing embodiment. Details are not described herein again.

It should be noted that, according to the display apparatus provided in this embodiment of the present disclosure, when only the main display screen displays an application interface, although the application interface displayed on the main display screen is a bottom application interface, the display apparatus can still respond to a user operation on the application interface displayed on the main display screen.

The user cannot only view the application interface displayed on the main display screen, but also perform an operation on the application interface displayed on the main display screen. When the main display screen displays an application interface and the transparent touchscreen displays an application interface, the display apparatus usually can respond to only a user operation on the application interface (the top application interface, for example, the second application interface) displayed on the transparent touchscreen. The user may view the application interface (the bottom application interface, for example, the first application interface) displayed on the main display screen, but cannot directly perform an operation on the application interface displayed on the main display screen. Therefore, to resolve the problem, in this embodiment of the present disclosure, when the main display screen displays the first application interface and the transparent touchscreen displays the second application interface, if a user needs to perform an operation on the first application interface displayed on the main display screen, the user may use either one of the following two manners (1) and (2).

(1). The first application interface displayed on the main display screen and the second application interface displayed on the transparent touchscreen are exchanged and displayed such that the first application interface originally displayed on the main display screen is displayed on the transparent touchscreen, and the second application interface originally displayed on the transparent touchscreen is displayed on the main display screen. The original bottom application interface is switched to the top application interface, and the original top application interface is switched to the bottom application interface. Therefore, the user can directly perform a touch operation on the top application interface.

In this embodiment of the present disclosure, the third touch operation may be used to trigger exchange and display of the first application interface and the second application interface. The following provides an example description of the third touch operation in three possible implementations.

In a first possible implementation, the third touch operation may be defined as pressing the "Home" button to return to the initial interface, and then selecting and activating a corresponding icon of an application to enable the application in order to switch and display two application interfaces. An application interface of the application is displayed on the transparent touchscreen, and an application interface of an application that is enabled before the application is enabled is displayed on the main display screen.

In a second possible implementation, the third touch operation may be defined as a predetermined gesture, to switch and display two application interfaces, an application interface displayed on the main display screen before switching is displayed on the transparent touchscreen after switching, and an application interface displayed on the transparent touchscreen before switching is displayed on the main display screen after switching.

The predetermined gesture may be further implemented using a pattern displayed on the display apparatus. For example, the display apparatus displays a 3×3 pattern consisting of nine points. The predetermined gesture may be a pattern formed by any one or more points that are connected in sequence. For implementation of the predetermined gesture, refer to a specific implementation of unlocking an intelligent terminal in the other approaches. Details are not described herein again.

In a third possible implementation, the third touch operation may be defined as a predetermined path, to switch and display two application interfaces. An application interface displayed on the main display screen before switching is displayed on the transparent touchscreen after switching, and an application interface displayed on the transparent touchscreen before switching is displayed on the main display screen after switching.

Figure 3C:
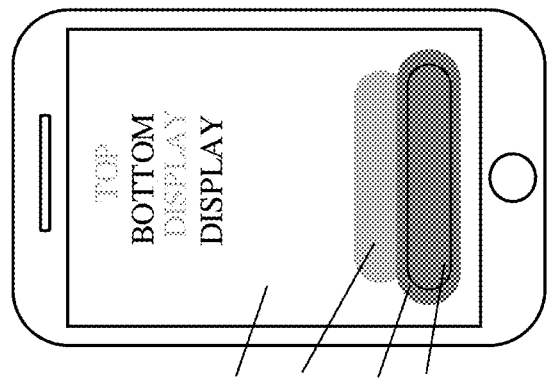
FIG. 3A, FIG. 3B, and FIG. 3C are schematic display diagrams of a display apparatus according to an embodiment of the present disclosure.
Figure 3B:
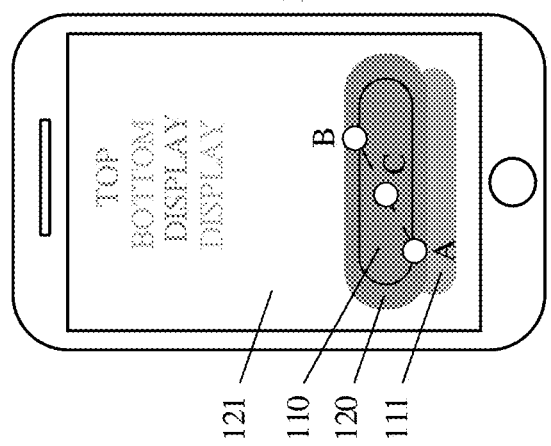
Figure 3A:
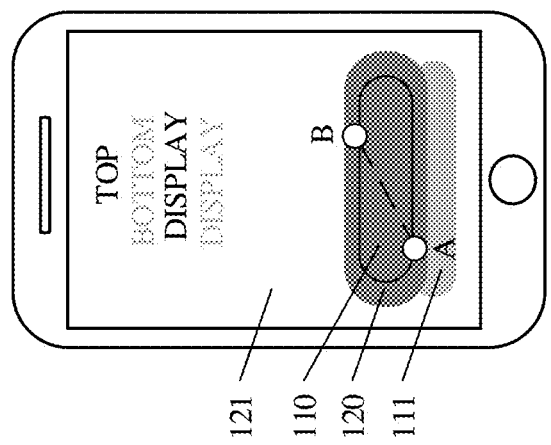

The predetermined path may be implemented in various regions displayed on the display apparatus. For example, in this embodiment of the present disclosure, the mode adjustment panel of the display apparatus displays the first shielding region, and the predetermined path may start from the first shielding region and end when the predetermined path leaves the first shielding region. For example, as shown in FIGS. 3A-3B, FIGS. 3A-3B are schematic diagrams of switching and displaying a first application interface and a second application interface displayed on a display apparatus. FIG. 3A shows a schematic diagram of the first application interface and the second application interface before switching and displaying, a main display screen displays the first application interface, a transparent touchscreen displays the second application interface, and a mode adjustment panel displays a first shielding region and a first non-shielding region. FIG. 3B shows a schematic diagram of the first application interface and the second application interface in a switch and display process. FIG. 3C shows a schematic diagram of the first application interface and the second application interface after switching and displaying, the main display screen displays the second application interface, the transparent touchscreen displays the first application interface, and the mode adjustment panel displays a second shielding region and a second non-shielding region (the second non-shielding region is a region other than the second shielding region on the mode adjustment panel).

Optionally, in this embodiment of the present disclosure, the controller may further control the mode adjustment panel to display a second non-shielding region at the second transparency. In this way, the other part of the second application interface, different from the part of the second application interface, is displayed at the second transparency and superimposed with a region other than the second interaction region in the first application interface.

Further, in FIG. 3A, content of the first application interface displayed on the main display screen is "BOTTOM DISPLAY", and the first application interface includes a second interaction region 111. Content of the second application interface displayed on the transparent touchscreen is "TOP DISPLAY", and the second application interface includes a first interaction region 110. The mode adjustment panel displays the first shielding region 120, and the mode adjustment panel displays the first non-shielding region 121. The first shielding region 120 is used to shield a part of the first application interface. Transparency of the first shielding region 120 is first transparency, for example, the first transparency being 0%. Transparency of the first non-shielding region 121 is second transparency, for example, the second transparency being 30%. In FIG. 3A, the part of the first application interface is displayed at the preset transparency and superimposed with the first interaction region 110, and the other part of the first application interface, different from the part of the first application interface, is displayed at the second transparency and superimposed with a region other than the first interaction region 110 in the second application interface.

In a switch and display scenario of the first application interface and the second application interface, the first transparency and the second transparency may be set by a user in user preference in an operating system of the display apparatus, or may be determined based on a display parameter (for example, a color difference between the first interaction region and the other region in the second application interface, or a brightness difference between the first interaction region and the other region) of the second application interface. This is not further limited in this embodiment of the present disclosure.

In the first possible implementation of the third touch operation, the third touch operation is mainly implemented by pressing a button. Therefore, in this possible implementation, an intermediate or transitional state of switching and displaying the first application interface and the second application interface does not exist when the first application interface and the second application interface are switched and displayed. In the second possible implementation and the third possible implementation of the third touch operation, the third touch operation is mainly implemented through contact between a user and the transparent touchscreen. Therefore, in the two possible implementations, an intermediate or transitional state of switching and displaying the first application interface and the second application interface exists when the first application interface and the second application interface are switched and displayed.

In terms of the second possible implementation and the third possible implementation of the third touch operation, the third possible implementation in which the third touch operation is defined as a predetermined path is used as an example. If the predetermined path is a path from a point A to a point B shown in FIG. 3A, when a user's finger moves from the point A to the point B, that is, when the transparent touchscreen detects that the user's finger moves from the point A to the point B, to produce a better display effect, the display apparatus may optionally present an intermediate or transitional state of switching and displaying the first application interface and the second application interface when the user's finger passes through a point C during movement from the point A to point B, as shown in FIG. 3B. In FIG. 3B, the transparency of the first shielding region 120 is third transparency, for example, the third transparency being 50%. The transparency of the first non-shielding region 121 is fourth transparency, for example, the fourth transparency being 15%. The content "TOP DISPLAY" in the second application interface is displayed at fifth transparency, for example, the fifth transparency being 65%. When the user's finger moves from the point A to the point B, that is, when the user removes the finger from the first shielding region 120, the transparent touchscreen detects the third touch operation. Then, as shown in FIG. 3C, the first application interface and the second application interface are switched and displayed based on the third touch operation. In FIG. 3C, the content of the second application screen displayed on the main display screen is "TOP DISPLAY", the content of the first application interface displayed on the transparent display screen is "BOTTOM DISPLAY", the mode adjustment panel displays the second shielding region 122, and the mode adjustment panel displays the second non-shielding region 123. The second shielding region 122 is used to shield a part of the second application interface. Transparency of the second shielding region 122 is the first transparency, for example, the first transparency being 0%. Transparency of the second non-shielding region 123 is the second transparency, for example, the second transparency being 30%. In FIG. 3C, the part of the second application interface is displayed at preset transparency (the first transparency) and superimposed with the second interaction region 111, and the other part of the second application interface, different from the part of the second application interface, is displayed at the second transparency and superimposed with a region other than the second interaction region 111 in the first application interface.

Optionally, the third touch operation may be set by a user in the user preference in the operating system of the display apparatus. This is not limited in this embodiment of the present disclosure.

Optionally, in this embodiment of the present disclosure, the third transparency, the fourth transparency, and the fifth transparency may be obtained by the display apparatus based on a location, relative to the first shielding region, of contact between a user and the transparent touchscreen.

In a possible implementation, the display apparatus obtains the third transparency, the fourth transparency, and the fifth transparency through calculation based on a ratio factor K of an area of an overlapping region between a region pressed by a user's finger (a contact area between the user's finger and the display apparatus during actual calculation) and the first shielding region to an area of the entire region pressed by the finger, where 0≤K≤1, and calculation formulas are as follows:

Third transparency=1−$K$*(1−First transparency);

Fourth transparency=$K$*Second transparency; and

Fifth transparency=1−$K$*(1−Second transparency).

For example, if the first transparency is 0%, the second transparency is 30%, and because each of the third transparency, the fourth transparency, and the fifth transparency is transparency of content when the area of the overlapping region between the region pressed by the user's finger and the first shielding region occupies a half of the area of the entire region pressed by the finger, K=0.5, Third transparency=1−0.5*(1−0%)=50%;

Fourth transparency=0.5*30%=15%; and

Fifth transparency=1−0.5*(1−30%)=65%.

It should be noted that, in this embodiment of the present disclosure, in FIG. 3B, transparency of content displayed on the bottom application interface, the transparency of the first shielding region 120, the transparency of the first non-shielding region 121, the transparency of the second shielding region, and the transparency of the second non-shielding region are all implemented by the controller by controlling transparency of a display interface on the mode adjustment panel. For example, the first transparency, the second transparency, the third transparency, and the fourth transparency are all implemented by the controller by controlling the transparency of the display interface on the mode adjustment panel. In FIG. 3B, transparency of content displayed on the top application interface is implemented by the controller by performing rendering processing on the top application interface displayed on the transparent touchscreen. For example, the fifth transparency is implemented by the controller by performing rendering processing on the top application interface displayed on the transparent touchscreen.

Optionally, in this embodiment of the present disclosure, when the transparent touchscreen detects that a user's finger moves from the point A to the point B, if the transparent touchscreen cannot detect the user's finger before detecting that the user's finger reaches the point B. The user has interrupted the third touch operation in this case, the controller controls the main display screen, the mode adjustment panel, and the transparent touchscreen to return to a display state before switching and displaying, as shown in FIG. 3A.

Optionally, movement of a user's finger from the point A to the point B is merely used to describe an example of switch and display in this embodiment of the present disclosure. It may be understood that, in this embodiment of the present disclosure, movement of a user's finger from the point B to the point A is also applicable to the foregoing switch and display process, and any movement manner such as repeated round-trip movement of a user's finger on a path between the point A and the point B may be also applicable to the foregoing switch and display process.

In the implementation (1), the first application interface displayed on the main display screen and the second application interface displayed on the transparent touchscreen may be exchanged and displayed using different third touch operations. Therefore, not only a user operation on the first application interface displayed on the main display screen, but also a user operation on the second application interface displayed on the transparent touchscreen is responded to.

(2). Pressure applied when a user performs a touch operation on the transparent touchscreen may be detected. When the pressure is greater than a preset threshold, a user operation on the first application interface displayed on the main display screen is responded to. When the pressure is less than or equal to the preset threshold, a user operation on the second application interface displayed on the transparent touchscreen is responded to.

In an optional implementation of this embodiment of the present disclosure, a pressure detection component may be disposed on the back of the main display screen, and the pressure detection component detects the pressure applied when the user performs the touch operation on the transparent touchscreen. Then, the display apparatus determines, based on the pressure and a location that is detected by the transparent touchscreen and at which the user performs the touch operation, to respond to a user operation on an application interface displayed on a specific display screen (the main display screen or the transparent touchscreen).

In this implementation, the pressure detection component may include at least three pressure sensors and a pressure drive circuit. Further, the pressure sensors may be disposed around the display apparatus.

In another optional implementation, a capacitance change that is between the transparent touchscreen and a baseboard reference surface and that is caused by the user touch operation on the transparent touchscreen may be detected using the transparent touchscreen, and the pressure applied when the user performs the touch operation on the transparent touchscreen is calculated based on the capacitance change. Then, the display apparatus determines, based on the pressure and a location that is detected by the transparent touchscreen and at which the user performs the touch operation to respond to a user operation on an application interface displayed on a specific display screen (the main display screen or the transparent touchscreen).

In the two optional implementations of the implementation (2), the display apparatus may determine, based on the pressure applied when the user performs the touch operation on the transparent touchscreen and the location at which the user performs the touch operation, to respond to the user operation on the application interface displayed on the specific display screen (the main display screen or the transparent touchscreen). For example, if the pressure is relatively large (for example, greater than the preset threshold), the display apparatus determines to respond to the user operation on the application interface (the first application interface) displayed on the main display screen. The display apparatus switches the user operation to the application interface displayed on the main display screen, and the display apparatus responds to the user operation on the application interface displayed on the main display screen. If the pressure is relatively small (for example, less than or equal to the preset threshold), the display apparatus determines to respond to the user operation on the application interface (the second application interface) displayed on the transparent touchscreen. The display apparatus keeps the user operation on the application interface displayed on the transparent touchscreen, and the display apparatus responds to the user operation on the application interface displayed on the transparent touchscreen.

In the display apparatus provided in this embodiment of the present disclosure, both a touch operation on the application interface (the first application interface) displayed on the main display screen and a touch operation on the application interface (the second application interface) displayed on the transparent touchscreen can be implemented in the two implementations (1) and (2).

Figure 4:
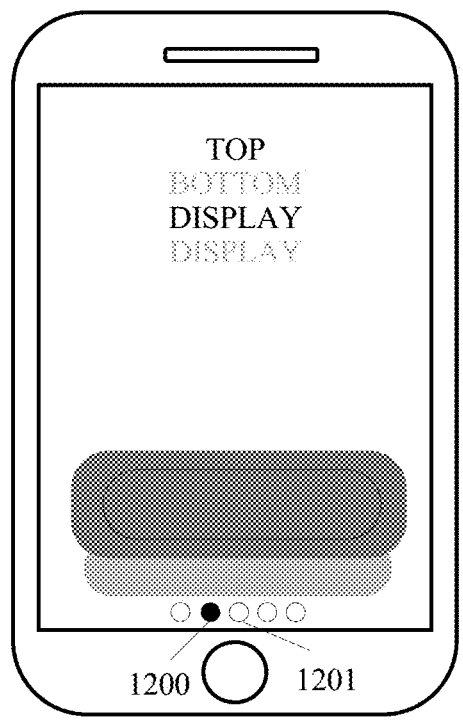
FIG. 4 is a schematic display diagram of a display apparatus according to an embodiment of the present disclosure.

Optionally, the transparent touchscreen of the display apparatus may further display a miniature icon of the top application interface and a miniature icon of the bottom application interface such that a user can view and adjust a stacking sequence of the top application interface and the bottom application interface. For example, with reference to FIG. 3A, as shown in FIG. 4, tag 1200 represents the miniature icon of the top application interface, and tag 1201 represents the miniature icon of the bottom application interface.

Figure 5:
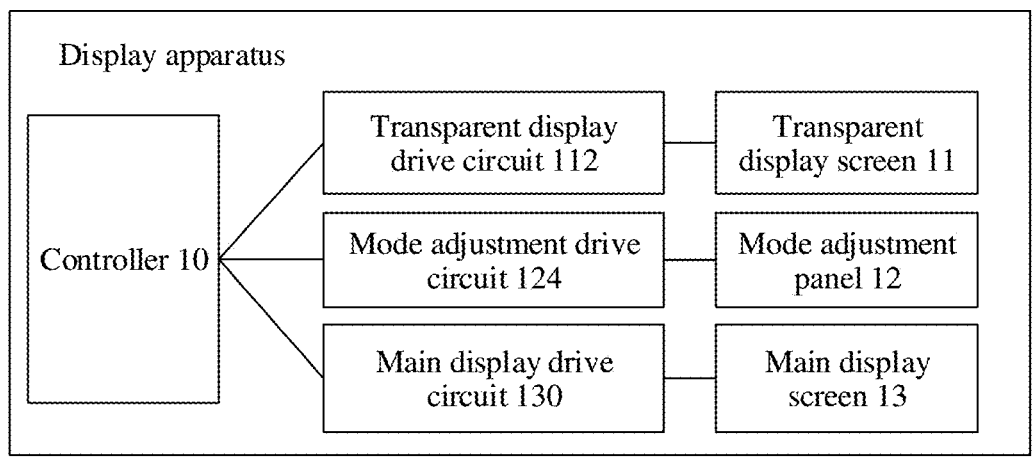
FIG. 5 is a schematic structural diagram of a display apparatus according to an embodiment of the present disclosure.

Optionally, with reference to FIG. 1, as shown in FIG. 5, the display apparatus provided in this embodiment of the present disclosure may further include a main display drive circuit 130 that is configured to drive the main display screen 13, a mode adjustment drive circuit 124 that is configured to drive the mode adjustment panel 12, and a transparent display drive circuit 112 that is configured to drive the transparent display screen 11.

The controller 10 is further configured to drive, using the main display drive circuit 130, the main display screen 13 to display, drive, using the transparent display drive circuit 112, the transparent display screen 11 to display, and drive, using the mode adjustment drive circuit 124, the mode adjustment panel 12 to display.

Further, for content displayed on the main display screen 13, the transparent display screen 11, and the mode adjustment panel 12 that are driven by the controller 10, refer to related descriptions in the foregoing embodiment. Details are not described herein again.

A person skilled in the art may understand that, if the display apparatus is a smartwatch, in a possible implementation, the first application interface may be a date and/or time interface displayed on the main display screen 13, or an application interface that includes the date and/or time interface. Further, the controller 10 may drive, using the main display drive circuit 130, the main display screen 13 to display the date and/or time interface, or display the application interface that includes the date and/or time interface.

In another possible implementation, the main display screen 13 may be a mechanical dial of the smartwatch, and the first application interface may be a date and/or time interface displayed on the mechanical dial. It may be understood that, in this implementation, the mechanical dial serving as the main display screen 13 may perform display in a conventional dial display manner. The mechanical dial may not be controlled by the controller 10 (in this implementation, the main display screen 13 may not be controlled by the controller 10).

Optionally, in the display apparatus provided in this embodiment of the present disclosure, the main display screen 13 may be a thin film transistor (TFT) liquid crystal display, a ultra-fine bright (UFB) liquid crystal display, an organic light-emitting diode (OLED) display screen, an active-matrix organic light emitting diode (AMOLED) display screen, or the like. The transparent display screen 11 (or the transparent touchscreen) may be the AMOLED display screen. A touch function of the transparent touchscreen may be implemented using a touch layer with a high rate of light transmission. The touch layer may be a resistive touch layer, a capacitive sensing touch layer, an infrared touch layer, or a surface acoustic wave touch layer.

The mechanical dial may be a mechanical dial with an auxiliary light source or a common mechanical dial without an auxiliary light source.

Figure 6:
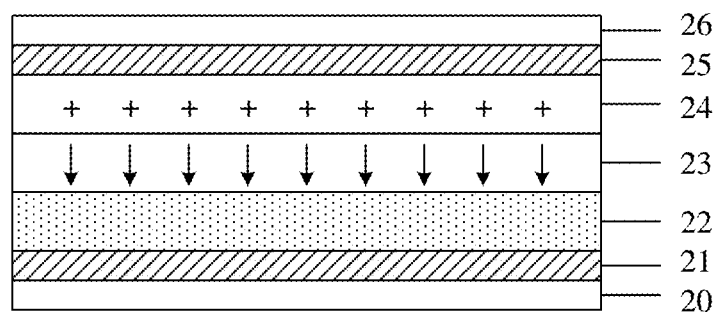
FIG. 6 is a schematic structural diagram of an electrochromic panel according to an embodiment of the present disclosure.

Optionally, in the display apparatus provided in the embodiments of the present disclosure, the mode adjustment panel may be further implemented using an electrochromic panel. FIG. 6 is a schematic structural diagram of an electrochromic panel according to an embodiment of the present disclosure. As shown in FIG. 6, the electrochromic panel includes a first transparent glass substrate 20, a first transparent conducting layer 21, an electrochromic layer 22, an electrolyte layer 23, an ion storage layer 24, a second transparent conducting layer 25, and a second transparent glass substrate 26 from bottom to top. Based on a structure of the electrochromic panel shown in FIG. 6, a working principle of the electrochromic panel is as follows. Initially, an electrochromic material in the electrochromic layer 22 is in a fully transparent state (for example, transparency of the electrochromic material is 100%). When a drive voltage is applied to the electrochromic panel using the first transparent conducting layer 21 and the second transparent conducting layer 25, a cation in the ion storage layer 24 is injected into the electrochromic layer 22 through the electrolyte layer 23, and a free electron in the drive voltage is injected into the electrochromic layer 22 through the first transparent conducting layer 21. Therefore, the cation and the free electron are combined in the electrochromic layer 22 such that an oxidation-reduction reaction occurs on the electrochromic material in the electrochromic layer 22 under the influence of the drive voltage, and a color of the electrochromic material changes (the transparency of the electrochromic material changes, for example, the transparency is reduced). When a drive voltage whose magnitude is the same as that of the foregoing drive voltage and whose direction is opposite to that of the foregoing drive voltage is applied to the electrochromic panel using the first transparent conducting layer 21 and the second transparent conducting layer 25, a reverse chemical reaction occurs on the electrochromic material in the electrochromic layer 22 to restore the electrochromic material to the original fully transparent state.

It should be noted that a phenomenon of a transparency (or color) change of the electrochromic material in the electrochromic layer 22 is referred to as an electrochromic effect of the electrochromic material. The electrochromic effect is a phenomenon of a transparency (or color) change caused because an electrochemical oxidation-reduction reaction occurs on the electrochromic material under the influence of an external drive voltage, and optical characteristics such as transmittance and reflectivity of the electrochromic material may change stably and reversibly. When the external drive voltage is constant, the optical characteristics of the electrochromic material may remain stable, and electric energy is not consumed.

The electrochromic material in the electrochromic layer 22 may be an inorganic electrochromic material or an organic electrochromic material. The inorganic electrochromic material includes an anode electrochromic material and a cathode electrochromic material. The cathode electrochromic material in the inorganic electrochromic material is used as an example. The cathode electrochromic material may be a group VIB metal oxide, and the group VIB metal oxide includes tungsten trioxide ($WO_3$), molybdenum trioxide ($MoO_3$), vanadium pentoxide ($V_2O_5$), and the like. An example is used in which the electrochromic material in the electrochromic layer 22 is $WO_3$. Before a drive voltage is applied to the electrochromic panel, the electrochromic material is in a fully transparent state. When the drive voltage is applied to the electrochromic panel, after a cation and a free electron are injected into a lattice gap of $WO_3$, a tungsten bronze ($M_xWO_3$) structure including $W^{+5}$ is generated, and the electrochromic material changes from the fully transparent state to a partially transparent blue. Correspondingly, when a drive voltage whose magnitude is the same as that of the foregoing drive voltage and whose direction is opposite to that of the foregoing drive voltage is applied to the electrochromic panel, the cation and the free electron are removed from the lattice gap of $WO_3$, and the electrochromic material is restored to the initial fully transparent state from the partially transparent blue. It may be understood that an electrochemical reaction occurred on the electrochromic material is a reversible chemical reaction.

In this embodiment of the present disclosure, in specific implementation, the electrochromic layer may be a thin film made using a method such as a sol method, a gel method, or a magnetron sputtering method.

Figure 7:
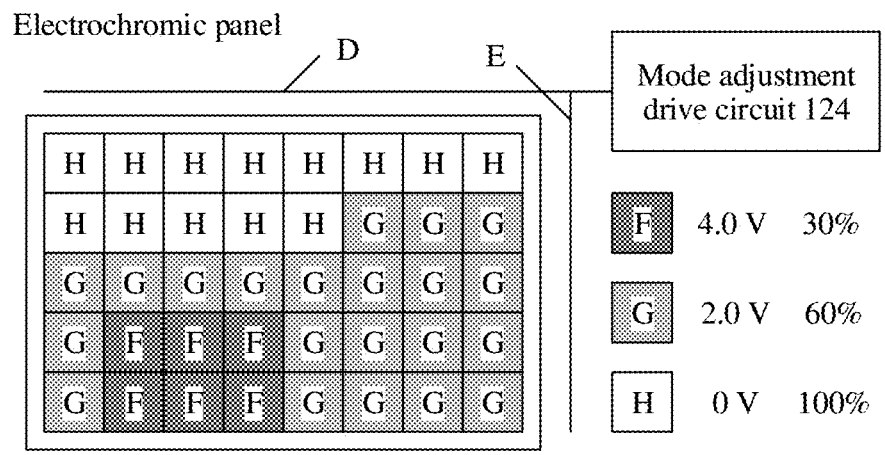
FIG. 7 is a schematic structural diagram of an electrochromic panel according to an embodiment of the present disclosure.

FIG. 7 is a schematic structural diagram of an electrochromic panel when the electrochromic panel is made into a grid (a grid is a pixel) control structure. As shown in FIG. 7, a mode adjustment drive circuit 124 selects a controlled grid using grid leads D and E, and applies, using a first transparent conducting layer and a second transparent conducting layer that form the grid, a drive voltage to an electrochromic material filled in the grid. When different drive voltages are applied to different grids, the grids present different transparency. For example, if drive voltages 4.0 volts (V), 2.0 V, and 0 V are respectively applied to grids represented by F, G, and H shown in FIG. 7, the grids represented by F, G, and H respectively present transparency of 30%, 60%, and 100%. For a specific working principle of the electrochromic panel, refer to related descriptions in the embodiment shown in FIG. 6. Details are not described herein again.

According to the display apparatus provided in the embodiments of the present disclosure, using a characteristic that the electrochromic panel may present different transparency when different drive voltages are applied to the electrochromic panel, not only two application interfaces can be simultaneously displayed, but also a better superimposed display effect of the two application interfaces can be ensured, thereby reducing a risk of a poor display effect of an intelligent terminal.

Figure 8:
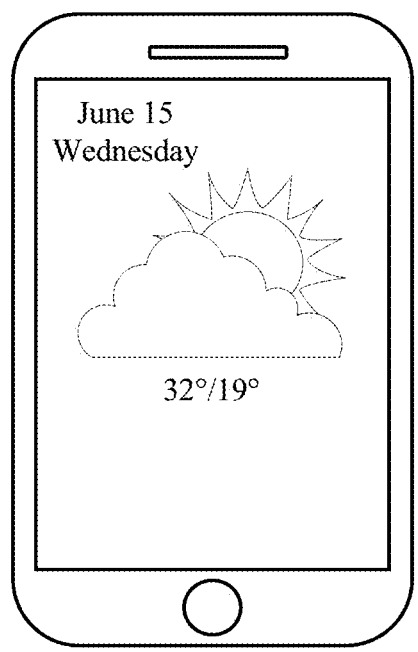
FIG. 8 is a schematic display diagram of a display apparatus according to an embodiment of the present disclosure.

Optionally, when the display apparatus provided in the embodiments of the present disclosure is in a lock screen state, to save power of the display apparatus and extend a standby time of the display apparatus, the display apparatus may disable the main display screen, the transparent display screen, and the touchscreen (or the transparent touchscreen that integrates the transparent display screen and the touchscreen), activate the mode adjustment panel, and control the mode adjustment panel to display common static information, for example, control the mode adjustment panel to display weather information, date information, or the like. For example, as shown in FIG. 8, FIG. 8 is a schematic diagram of static information displayed on a display apparatus according to an embodiment of the present disclosure.

Figure 9:
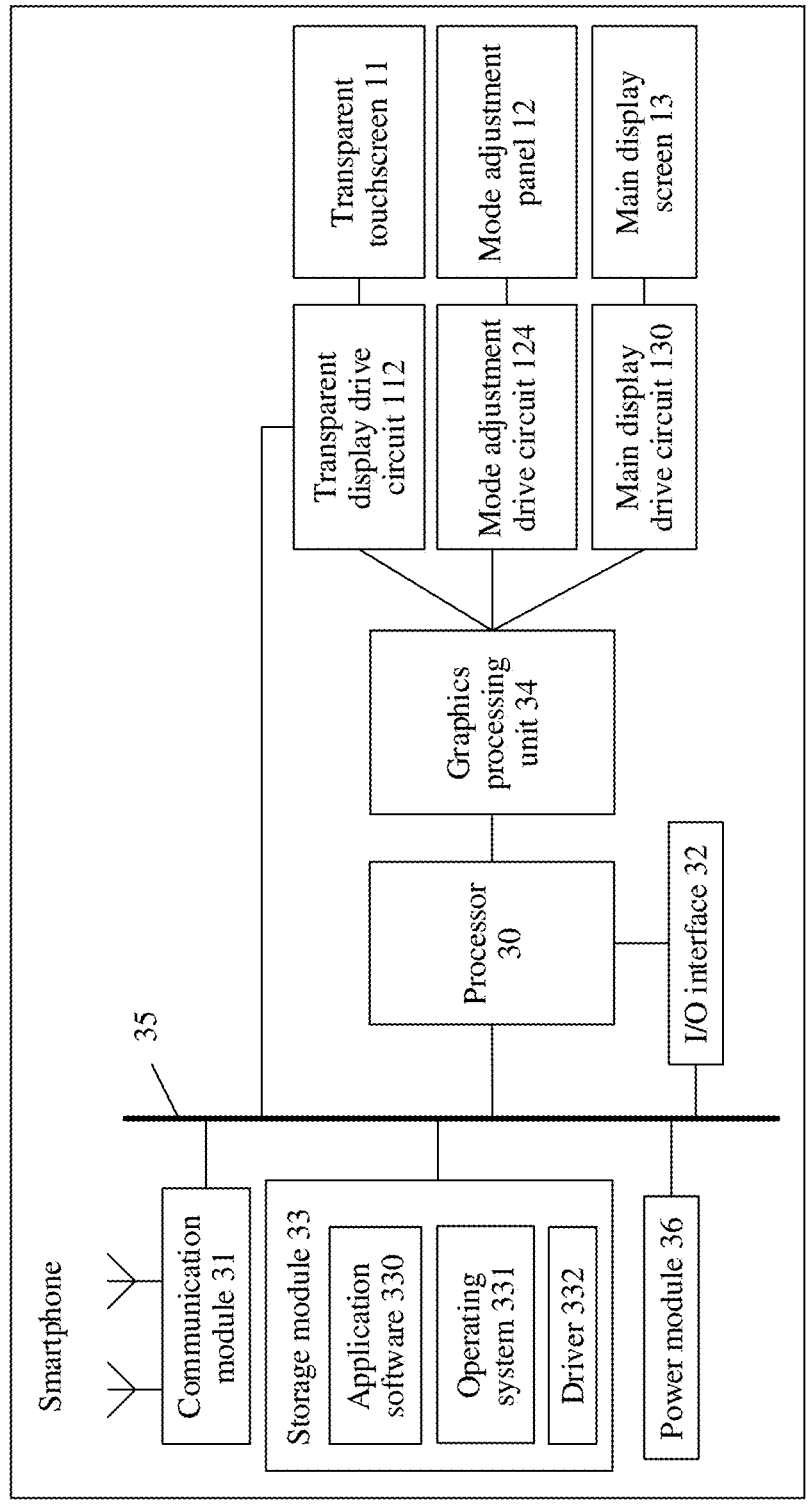
FIG. 9 is a schematic diagram of hardware of a smartphone according to an embodiment of the present disclosure.

An embodiment of the present disclosure provides an intelligent terminal. The intelligent terminal includes the display apparatus described in the foregoing embodiments. To better understand the technical solutions in the embodiments of the present disclosure, the following describes, using an example in which the display apparatus provided in the embodiments of the present disclosure is an intelligent terminal, an example of a specific implementation of the intelligent terminal provided in this embodiment of the present disclosure. Further, in this embodiment of the present disclosure, an example in which the intelligent terminal is a smartphone is used for description. FIG. 9 shows a schematic block diagram of some hardware of a smartphone related to the embodiments of the present disclosure.

As shown in FIG. 9, the smartphone may include a processor 30, a communication module 31, an input/output (I/O) interface 32, a storage module 33, a graphics processing unit 34, a main display screen 13, a main display drive circuit 130 that is configured to drive the main display screen 13, a mode adjustment panel 12, a mode adjustment drive circuit 124 that is configured to drive the mode adjustment panel 12, a transparent touchscreen 11, and a transparent display drive circuit 112 that is configured to drive the transparent touchscreen 11 (an example in which a transparent display screen and a touchscreen are an integrated component is used for description in this embodiment).

The processor 30, the communication module 31, the I/O interface 32, and the storage module 33 are connected to each other using a system bus 35. The graphics processing unit 34 is connected to the processor 30. The main display screen 13 is connected to the graphics processing unit 34 using the main display drive circuit 130. The mode adjustment panel 12 is connected to the graphics processing unit 34 using the mode adjustment drive circuit 124. The transparent touchscreen 11 is connected to the graphics processing unit 34 and the bus system 35 using the transparent display drive circuit 112.

It should be noted that the processor 30, the storage module 33, and the graphics processing unit 34 may be further the controller in the display apparatus provided in the embodiments of the present disclosure, or a combination of components that are configured to implement functions of the controller in the display apparatus provided in the embodiments of the present disclosure. In this embodiment of the present disclosure, when the transparent display drive circuit 112 detects a user touch operation (for example, the first touch operation, the second touch operation, or the third touch operation in the embodiments of the present disclosure) on the transparent touchscreen 11, the transparent display drive circuit 112 converts the touch operation into a touch signal, and transmits the touch signal to the I/O interface 32 using the system bus 35. The processor 30 reads the touch signal from the system bus using the I/O interface 32, and then invokes an operating system 331 in the storage module 33 to process the touch signal. After processing the touch signal, the processor 30 transmits a processing result to the graphics processing unit 34. The graphics processing unit 34 separately drives, using a drive circuit of a corresponding component, the corresponding component to display an application interface. For details and descriptions of the complete display process, refer to related descriptions in the embodiments shown in FIG. 1 to FIG. 8. In addition, for specific descriptions of the controller (which may be implemented using the processor 30, the storage module 33, and the graphics processing unit 34 in this embodiment), the main display screen 13, the mode adjustment panel 12, and the transparent touchscreen 11, refer to related descriptions in the embodiments shown in FIG. 1 to FIG. 8. To avoid repetition, details are not described herein again.

The communication module 31 may be a radio frequency (RF) module, and may be configured to receive and send a signal in an information transmission/reception process or in a call process. Particularly, after receiving a downlink signal, the communication module 31 sends the downlink signal to the processor 30 for processing. In addition, the communication module 31 is configured to send an uplink signal. The communication module 31 usually includes but is not limited to an antenna, at least one amplifier, a transceiver, a coupler, a low noise amplifier (LNA), a duplexer, or the like. In addition, the communication module 31 may further communicate with a network and another device through wireless communication. Any communications standard or protocol may be used for the wireless communication, and the communications standard or protocol includes but is not limited to the Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), or the like.

The processor 30 may be a central processing unit (CPU). The processor 30 may be further another general purpose processor, a digital signal processor (DSP), an application-specific integrated circuit (ASIC), a field-programmable gate array (FPGA) or another programmable logic device, a discrete gate or transistor logic device, a discrete hardware assembly, or the like. The general purpose processor may be a microprocessor, or the processor may be any conventional processor or the like. The processor 30 may be a CPU with a single chip, a CPU with a plurality of chips, or a system on chip CPU of a coprocessor. The processor 30 may be an 8-bit processor, a 16-bit processor, a 32-bit processor, a 64-bit processor, a multi-core designed processor, or the like.

The storage module 33 may be a volatile memory, for example, a random-access memory (RAM). The storage module 33 may be a nonvolatile memory, for example, a read-only memory (ROM), a flash memory, a hard disk drive (HDD), or a solid-state drive (SSD). The storage module 33 may be a combination of the foregoing types of memories.

The storage module 33 includes application software 330, an operating system 331, and a driver 332. The application software 330 may include any application software running on the smartphone. The operating system 331 may obtain, from the system bus 35, the touch operation (for example, the first touch operation, the second touch operation, or the third touch operation in the embodiments of the present disclosure) obtained by the processor 30 from a touch drive circuit (not shown) using the I/O interface 32, process and control display of a plurality of application interfaces based on the touch operation, and output a processing and controlling result to the system bus 35. The graphics processing unit 34 obtains the processing and controlling result from the system bus 35, and sends the processing and controlling result to each drive circuit (for example, the main display drive circuit 130, the mode adjustment drive circuit 124, and the transparent display drive circuit 112). Then each drive circuit drives a corresponding display screen or panel to display an application interface (for details of displaying an application interface, refer to related descriptions in the embodiments shown in FIG. 1 to FIG. 8). The driver 332 may be a driver that drives the operating system 331 to perform the foregoing process.

Further, in this embodiment of the present disclosure, the application software 330 may be configured to complete some computer-executable tasks, which include but are not limited to word processing, a spreadsheet, a media player, a web browser, database application, and the like. The operating system 331 may further provide a GUI to implement interaction between a user and system hardware. The operating system 331 may further manage and coordinate hardware and software resources of a computer system, and provide an application programming interface (API) between a plurality of different types of application software 330 such that data can be exchanged between the different types of application software 330.

The system bus 35 may include a data bus, a power supply bus, a control bus, a signal status bus, and the like. In this embodiment, for clarity of description, various buses are represented by the system bus 35 in FIG. 9.

As shown in FIG. 9, the smartphone provided in this embodiment of the present disclosure may further include a power module 36 connected to the system bus 35. The power module 36 may implement functions such as charging, discharging, and power consumption management on the smartphone.

The I/O interface 32 may be used by the processor 30 to perform data transmission with another module.

Optionally, the smartphone may further include a WI-FI module, a Bluetooth module, and the like that are not shown in FIG. 9. Details are not described in this embodiment of the present disclosure.

This embodiment of the present disclosure further provides a computer-readable storage medium. The computer-readable storage medium stores one or more programs. The one or more programs include a computer executable instruction. When the processor of the intelligent terminal executes the computer executable instruction, the intelligent terminal performs a display method performed by a display apparatus in the following method embodiment. For the specific display method, refer to related descriptions in the following method embodiment. Details are not described herein.

According to the intelligent terminal provided in this embodiment of the present disclosure, when two application interfaces (for example, a first application interface and a second application interface) need to be simultaneously displayed, the corresponding application interfaces may be respectively displayed using the main display screen and the transparent touchscreen (for example, the main display screen displays the first application interface, and the transparent touchscreen displays the second application interface) of the intelligent terminal, a first shielding region that is used to shield a part of the first application interface may be determined on the mode adjustment panel, and the first shielding region is displayed at transparency less than 85% on the mode adjustment panel such that the part of the first application interface is displayed at the transparency less than 85% and superimposed with a first interaction region. Therefore, not only the two application interfaces can be simultaneously displayed by the intelligent terminal, but also a better superimposed display effect of the two application interfaces can be ensured. Compared with the other approaches, the intelligent terminal provided in this embodiment of the present disclosure cannot only produce a better superimposed display effect of two application interfaces, but also reduce a risk of a poor display effect of the intelligent terminal.

Figure 10:
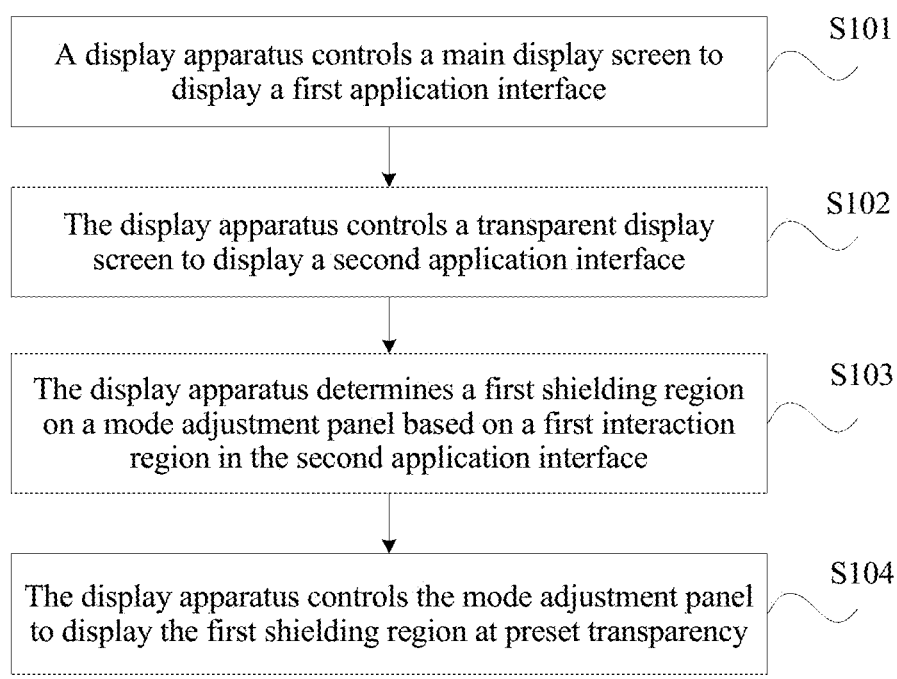
FIG. 10 is a flowchart diagram of a display method according to an embodiment of the present disclosure.

Based on the display apparatus in the embodiments shown in FIG. 1 to FIG. 8, the display apparatus includes a transparent display screen, a mode adjustment panel, and a main display screen that are arranged in a stacking manner. The mode adjustment panel is located between the transparent display screen and the main display screen. An embodiment of the present disclosure provides a display method. As shown in FIG. 10, the display method may include the following steps.

Step S101. The display apparatus controls the main display screen to display a first application interface.

Step S102. The display apparatus controls the transparent display screen to display a second application interface.

Step S103. The display apparatus determines a first shielding region on the mode adjustment panel based on a first interaction region in the second application interface.

Step S104. The display apparatus controls the mode adjustment panel to display the first shielding region at preset transparency.

The preset transparency is less than or equal to 85%. The first shielding region is used to shield a part of the first application interface such that the part of the first application interface is displayed at the preset transparency and superimposed with the first interaction region.

For descriptions of the main display screen, the mode adjustment panel, the transparent display screen, the first application interface, the second application interface, the first interaction region, the first shielding region, and first transparency, refer to related descriptions in the embodiments shown in FIG. 1 to FIG. 8. Details are not described herein again.

The following further describes, using a possible application scenario as an example, in detail the display method provided in this embodiment of the present disclosure.

Figure 11A:
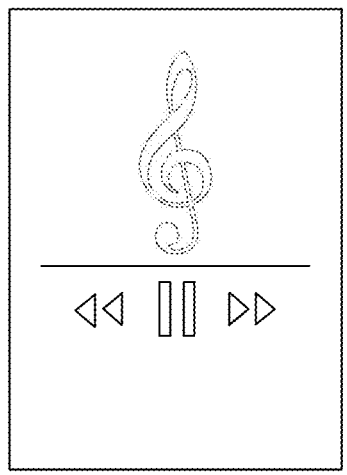
FIG. 11A, FIG. 11B, FIG. 11C, and FIG. 11D are schematic display diagrams of a display apparatus according to an embodiment of the present disclosure.
Figure 11B:
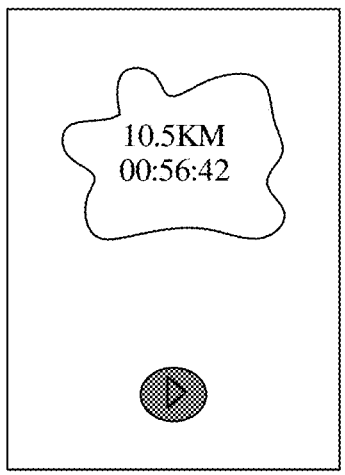
Figure 11C:
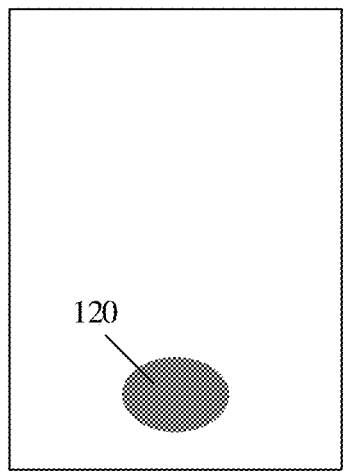
Figure 11D:
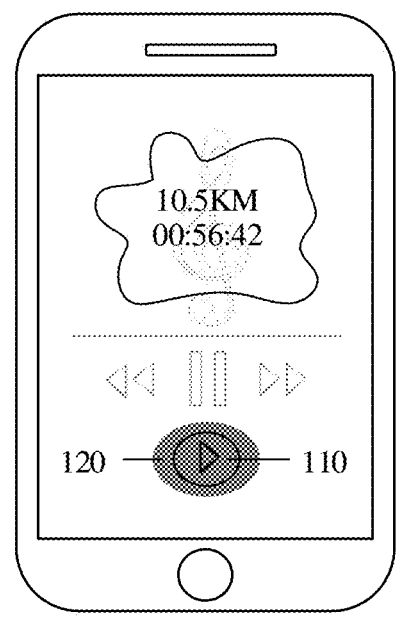

It is assumed that a user needs to simultaneously use a "multimedia music playback" application (which is referred to as an application 1 for short below) and a "path record" application (which is referred to as an application 2 for short below) during jogging exercises. FIGS. 11A-11D show schematic diagrams of displaying the two applications by the display apparatus using the display method provided in this embodiment of the present disclosure. Further, when the user touches an icon of the application 1 (the first touch operation), the display apparatus activates the application 1, as shown in FIG. 11A. After the display apparatus activates the application 1, the display apparatus displays an interface (the first application interface) of the application 1 on the main display screen. When the user touches an icon of the application 2 (the second touch operation, and during an actual operation, the user may first press a "Home" button to return to an initial interface of the display apparatus, and then touch the icon of the application 2), the display apparatus activates the application 2, as shown in FIG. 11B. After the display apparatus activates the application 2, the display apparatus displays an interface (the second application interface) of the application 2 on the transparent display screen, and the display apparatus displays the interface of the application 1 on the main display screen. As shown in FIG. 11C, the display apparatus determines a first shielding region 120 on the mode adjustment panel based on a first interaction region (for example, a start/pause button) in the interface of the application 2. The first shielding region 120 is used to shield a part of the interface of the application 1. As shown in FIG. 11D, the display apparatus controls the mode adjustment panel to display the first shielding region 120 at preset transparency (the first transparency in the foregoing embodiments, and it is assumed that the preset transparency is 0%) such that the part of the interface of the application 1 is displayed at the preset transparency and superimposed with the first interaction region. The interface of the application 1, the interface of the application 2, and the first shielding region 120 are superimposed for displaying on the display apparatus.

As shown in FIG. 11D, the user may perform a touch operation on the application 1 in the first interaction region 110 of the application 2, for example, start or suspend the application 1. Further, because the first shielding region 120 shields content (the part of the interface of the application 1) that is in the interface of the application 1 and whose location is the same as that of the first shielding region 120, the user cannot only view the two application interfaces, but also perform a touch operation on the interface of the application 2 in the first interaction region 110 in the interface of the application 2 without interference in order to improve user experience.

Optionally, with reference to FIG. 10, the display method provided in this embodiment of the present disclosure may further include the following step.

Step S105. The display apparatus controls the mode adjustment panel to display a first non-shielding region at second transparency.

The first non-shielding region is a region other than the first shielding region on the mode adjustment panel. The second transparency is greater than the preset transparency (the first transparency).

In this embodiment of the present disclosure, the display apparatus controls the mode adjustment panel to display the first non-shielding region at the second transparency such that the other part of the first application interface, different from the part of the first application interface, is displayed at the second transparency and superimposed with a region other than the first interaction region in the second application interface.

For specific descriptions of the first non-shielding region and the second transparency, refer to related descriptions in the embodiments shown in FIG. 1 to FIG. 8. Details are not described herein again.

In actual implementation, steps S105 and S104 may be simultaneously performed.

Optionally, with reference to FIG. 10, in the display method provided in this embodiment of the present disclosure, step S103 may further include the following steps.

Step S103a. The display apparatus obtains characteristic data of the first interaction region in the second application interface.

Step S103b. The display apparatus determines the first shielding region based on the characteristic data of the first interaction region.

Optionally, in this embodiment of the present disclosure, the characteristic data of the first interaction region includes a location of the first interaction region on the second application interface and an area of the first interaction region.

The location of the first interaction region on the second application interface is used to determine a projection of the first interaction region on the mode adjustment panel in a direction perpendicular to the mode adjustment panel. The projection of the first interaction region on the mode adjustment panel in the direction perpendicular to the mode adjustment panel falls within the first shielding region. An area of the first shielding region is greater than or equal to the area of the first interaction region.

Optionally, a projection of the first shielding region on the main display screen in a direction perpendicular to the main display screen is completely overlapped with the part of the first application interface. In this way, it can be ensured that the first shielding region can completely shield the part of the first application interface such that a user can perform an operation on the first interaction region without interference and impact from the part of the first application interface.

For a description of the first shielding region and a method for determining the first shielding region, refer to related descriptions in the embodiments shown in FIG. 1 to FIG. 8. Details are not described herein again.

Optionally, with reference to FIG. 10, when the display apparatus provided in the embodiments of the present disclosure is other intelligent terminal than the smartwatch, the display method provided in this embodiment of the present disclosure may further include the following steps.

Step S106. The display apparatus obtains a first touch operation.

Step S107. The display apparatus controls, based on the first touch operation, the main display screen to display the first application interface.

Step S108. The display apparatus obtains a second touch operation.

Step S109. The display apparatus controls, based on the second touch operation, the transparent display screen to display the second application interface.

The first touch operation is used to trigger the display apparatus to display the first application interface. The second touch operation is used to trigger the display apparatus to display the second application interface.

In an embodiment, steps S106 to S109 may be performed before step S101. In another embodiment, steps S106 to S109 may be first performed, and then steps S101 to S105 are performed.

Optionally, with reference to FIG. 10, the display method provided in this embodiment of the present disclosure may further include the following steps.

Step S110. The display apparatus obtains a touch display operation, where the touch display operation is used to trigger the display apparatus to determine the first interaction region in the second application interface.

Step S111. The display apparatus determines the first interaction region in the second application interface based on the touch display operation.

For specific descriptions of steps S110 and S111, refer to related descriptions in the embodiments shown in FIG. 1 to FIG. 8. Details are not described herein again.

Optionally, in the display method provided in this embodiment of the present disclosure, because a user can perform an operation only on a top application interface displayed on the transparent display screen in the display apparatus, when the user needs to perform an operation on a bottom application interface displayed on the main display screen, the user needs to trigger exchange and display of the top application interface and the bottom application interface. The top application interface originally displayed on the transparent display screen is switched to the bottom application interface displayed on the main display screen, and the bottom application interface originally displayed on the main display screen is switched to the top application interface displayed on the transparent display screen.

For example, with reference to FIG. 10, the display method provided in this embodiment of the present disclosure may further include the following steps.

Step S112. When the main display screen displays the first application interface and the transparent display screen displays the second application interface, the display apparatus obtains a touch operation.

To distinguish between different touch operations in this embodiment of the present disclosure, the touch operation herein is referred to as a third touch operation below. The third touch operation is used to trigger the display apparatus to exchange and display the first application interface and the second application interface.

Step S113. The display apparatus controls, based on the touch operation, the main display screen to display the second application interface, and controls, based on the touch operation, the transparent display screen to display the first application interface.

Step S114. The display apparatus determines a second shielding region on the mode adjustment panel based on a second interaction region in the first application interface.

Step S115. The display apparatus controls the mode adjustment panel to display the second shielding region at the preset transparency.

The second shielding region is used to shield a part of the second application interface such that the part of the second application interface is displayed at the preset transparency (the first transparency) and superimposed with the second interaction region.

Optionally, the display apparatus provided in the embodiments of the present disclosure may further control the mode adjustment panel to display a second non-shielding region at the second transparency. The second non-shielding region is a region other than the second shielding region on the mode adjustment panel. In this way, the other part of the second application interface, different from the part of the second application interface, is displayed at the second transparency and superimposed with a region other than the second interaction region in the first application interface.

For specific descriptions of the first touch operation, the second touch operation, the third touch operation, the second shielding region, and the second non-shielding region, refer to related descriptions in the embodiments shown in FIG. 1 to FIG. 8. Details are not described herein again.

It should be noted that, in this embodiment of the present disclosure, for specific descriptions of steps S101 to S115, S103a, and S103b, refer to related descriptions in the embodiments shown in FIG. 1 to FIG. 8. To avoid repetition, details are not described herein again.

This embodiment of the present disclosure provides the display method, and the display method is applied to the display apparatus described in the foregoing embodiments. When two application interfaces (for example, the first application interface and the second application interface) need to be simultaneously displayed, the corresponding application interfaces may be respectively displayed using the main display screen and the transparent display screen (for example, the main display screen displays the first application interface, and the transparent display screen displays the second application interface) of the display apparatus, the first shielding region that is used to shield the part of the first application interface may be determined on the mode adjustment panel, and the first shielding region is displayed at transparency less than 85% on the mode adjustment panel such that the part of the first application interface is displayed at the transparency less than 85% and superimposed with the first interaction region. Therefore, not only the two application interfaces can be simultaneously displayed, but also a better superimposed display effect of the two application interfaces can be ensured. Compared with the other approaches, according to the display method provided in this embodiment of the present disclosure, not only a better superimposed display effect of two application interfaces can be produced, but also a risk of a poor display effect of the display apparatus can be reduced.

An embodiment of the present disclosure provides a GUI on a display apparatus. The display apparatus includes a transparent display screen, a mode adjustment panel, and a main display screen that are arranged in a stacking manner. The mode adjustment panel is located between the transparent display screen and the main display screen. The GUI may include a first application interface, a second application interface, and a first shielding region. A part of the first application interface is shielded by the first shielding region, the second application interface includes a first interaction region, and the first shielding region is displayed at preset transparency such that the part of the first application interface is displayed at the preset transparency and superimposed with the first interaction region. The preset transparency is less than or equal to 85%. In response to a detected trigger for a first application from a user, the first application interface (an interface of the first application) is displayed on the main display screen. In response to a detected trigger for a second application from the user, the second application interface (an interface of the second application) is displayed on the transparent display screen, and the first shielding region is displayed at the preset transparency on the mode adjustment panel.

Optionally, the GUI provided in this embodiment of the present disclosure may further include a first non-shielding region. The first non-shielding region is displayed at second transparency. The other part of the first application interface, different from the part of the first application interface, is displayed at the second transparency and superimposed with a region other than the first interaction region in the second application interface. The first non-shielding region is a region other than the first shielding region on the mode adjustment panel. The second transparency is greater than the first transparency. In response to the detected trigger for the second application from the user, the first non-shielding region is displayed at the second transparency on the mode adjustment panel.

A person skilled in the art may understand that the first shielding region and the first non-shielding region jointly constitute a display interface of the mode adjustment panel. Therefore, in actual implementation, the first shielding region and the first non-shielding region are simultaneously displayed at different transparency on the mode adjustment panel.

Optionally, in the GUI provided in this embodiment of the present disclosure, a projection of the first interaction region on the mode adjustment panel in a direction perpendicular to the mode adjustment panel falls within the first shielding region, and an area of the first shielding region is greater than or equal to an area of the first interaction region.

Optionally, in the GUI provided in this embodiment of the present disclosure, a projection of the first shielding region on the main display screen in a direction perpendicular to the main display screen is completely overlapped with the part of the first application interface.

Optionally, in the GUI provided in this embodiment of the present disclosure, the transparent display screen is further a transparent touchscreen (the transparent display screen is a component that integrates a display function and a touch function). The first application is triggered when the transparent touchscreen detects a first touch operation of the user, and the second application is triggered when the transparent touchscreen detects a second touch operation of the user. For specific descriptions of triggering the first application by the first touch operation of the user and triggering the second application by the second touch operation, refer to related descriptions in the embodiments shown in FIG. 1 to FIG. 8. Details are not described herein again.

Optionally, in the GUI provided in this embodiment of the present disclosure, the first interaction region in the second application interface is determined when the transparent touchscreen detects a touch display operation.

For specific descriptions of the touch display operation and determining the first interaction region in the second application interface based on the touch display operation, refer to related descriptions in the embodiments shown in FIG. 1 to FIG. 8. Details are not described herein again.

Optionally, the first application interface and the second application interface in the GUI provided in this embodiment of the present disclosure are exchanged and displayed, the first shielding region is switched to a second shielding region, a part of the second application interfaces is shielded by the second shielding region, the first application interface includes a second interaction region, and the second shielding region is displayed at the preset transparency such that the part of the second application interface is displayed at the preset transparency and superimposed with the second interaction region. In response to a user touch operation (the third touch operation) detected by the transparent touchscreen, the second application interface is displayed on the main display screen, the first application interface is displayed on the transparent touchscreen, and the second shielding region is displayed at the preset transparency on the mode adjustment panel.

For specific descriptions of the third touch operation of the user, refer to related descriptions in the embodiments shown in FIG. 1 to FIG. 8. Details are not described herein again.

For a specific schematic diagram of the GUI provided in this embodiment of the present disclosure, refer to schematic diagrams in the embodiments shown in FIG. 2, FIGS. 3A-3C, FIG. 4, FIG. 8, and FIGS. 11A-11D. For specific descriptions of the GUI, refer to related descriptions in the embodiments shown in FIG. 2, FIGS. 3A-3C, FIG. 4, FIG. 8, and FIGS. 11A-11D. To avoid repetition, details are not described herein again. In addition, for specific descriptions of other content related to the GUI, refer to related descriptions in the embodiments shown in FIG. 1 to FIG. 11D. To avoid repetition, details are not described herein again.

This embodiment of the present disclosure provides the GUI, and the GUI is a GUI on the display apparatus described in the foregoing embodiments. The GUI includes the first application interface displayed on the main display screen, the second application interface displayed on the transparent display screen, and the first shielding region displayed at the transparency less than 85% on the mode adjustment panel. The first shielding region is used to shield the part of the first application interface, and the part of the first application interface is displayed at the transparency less than 85% and superimposed with the first interaction region in the second application interface. In this way, not only two application interfaces (for example, the first application interface and the second application interface) can be simultaneously displayed, but also a better superimposed display effect of the two application interfaces can be ensured. Compared with the other approaches, the GUI provided in this embodiment of the present disclosure cannot only produce a better superimposed display effect of two application interfaces, but also reduce a risk of a poor display effect of the display apparatus.

The foregoing descriptions about implementations allow a person skilled in the art to understand that, for the purpose of convenient and brief description, division of the foregoing function modules is taken as an example for description. In actual application, the foregoing functions can be allocated to different modules and implemented based on a requirement, an inner structure of an apparatus is divided into different function modules to implement all or part of the functions described above. For a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in another manner. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A display apparatus, comprising:
a controller;
a main display screen coupled to the controller and configured to display a first application interface;
a transparent touchscreen coupled to the controller and the main display screen and configured to display a second application interface, wherein the second application interface is superimposed on the first application interface, and wherein the first application interface and the second application interface simultaneously display different information; and
a mode adjustment panel coupled to the controller, the main display screen, and the transparent touchscreen, wherein the main display screen is arranged in a stacking manner, and wherein the mode adjustment panel is located between the transparent touchscreen and the main display screen, and
wherein the controller is configured to:
determine a first interaction region at a location region on the second application interface based on a user input received at the first interaction region;
identify a first shielding region on the mode adjustment panel based on the first interaction region, wherein the first interaction region overlays the first shielding region;
control the mode adjustment panel to display the first shielding region at a preset transparency to shield a part of the first application interface, wherein the first shielding region overlays the part of the first application interface such that the part of the first application interface does not interfere with a visibility of the first interaction region, and wherein the preset transparency is less than or equal to 85%; and
obtain a touch operation detected by the transparent touchscreen, wherein the touch operation triggers the display apparatus to exchange the first application interface with the second application interface, and display the first application interface on the transparent touchscreen and the second application interface on the main display screen.

2. The display apparatus of claim 1, wherein a projection of the first interaction region on the mode adjustment panel in a direction perpendicular to the mode adjustment panel falls within the first shielding region, and wherein an area of the first shielding region is greater than an area of the first interaction region.

3. The display apparatus of claim 1, wherein a projection of the first interaction region on the mode adjustment panel in a direction perpendicular to the mode adjustment panel falls within the first shielding region, and wherein an area of the first shielding region is equal to an area of the first interaction region.

4. The display apparatus of claim 1, wherein a projection of the first shielding region on the main display screen in a direction perpendicular to the main display screen completely overlaps the part of the first application interface.

5. The display apparatus of claim 1, wherein the controller is further configured to:
obtain a touch display operation detected by the transparent touchscreen, wherein the touch display operation triggers the display apparatus to identify the first interaction region in the second application interface; and
identify the first interaction region in the second application interface based on the touch display operation.

6. The display apparatus of claim 1, wherein the controller is further configured to:
control the main display screen to display the second application interface based on the touch operation;
control, the transparent touchscreen to display the first application interface based on the touch operation;
identify a second shielding region on the mode adjustment panel based on a second interaction region in the first application interface; and
control the mode adjustment panel to display the second shielding region at the preset transparency, wherein the second shielding region shields a part of the second application interface, and wherein the part of the second application interface is displayed at the preset transparency and superimposed with the second interaction region.

7. A display method, applied to a display apparatus comprising a transparent touchscreen, a mode adjustment panel, and a main display screen arranged in a stacking manner, wherein the mode adjustment panel is located between the transparent touchscreen and the main display screen, and wherein the display method comprises:
controlling the main display screen to display a first application interface;
controlling the transparent touchscreen to display a second application interface, wherein the second application interface is superimposed on the first application interface, and wherein the first application interface and the second application interface simultaneously display different information;
determining a first interaction region at a location region on the second application interface based on a user input received at the first interaction region;
identifying a first shielding region on the mode adjustment panel based on the first interaction region, wherein the first interaction region overlays the first shielding region; and
controlling the mode adjustment panel to display the first shielding region at a preset transparency to shield a part of the first application interface, wherein the first shielding region overlays the part of the first application interface such that the part of the first application interface does not interfere with a visibility of the first interaction region, and wherein the preset transparency is less than or equal to 85%; and
obtaining a touch operation triggering the display apparatus to exchange the first application interface with the second application interface, and display the first application interface on the transparent touchscreen and the second application interface on the main display screen.

8. The display method of claim 7, wherein a projection of the first interaction region on the mode adjustment panel in a direction perpendicular to the mode adjustment panel falls within the first shielding region, and wherein an area of the first shielding region is greater than an area of the first interaction region.

9. The display method of claim 7, wherein a projection of the first interaction region on the mode adjustment panel in a direction perpendicular to the mode adjustment panel falls within the first shielding region, and wherein an area of the first shielding region is equal to an area of the first interaction region.

10. The display method of claim 7, wherein a projection of the first shielding region on the main display screen in a direction perpendicular to the main display screen completely overlaps the part of the first application interface.

11. The display method of claim 7, further comprising:
obtaining a touch display operation, wherein the touch display operation triggers the display apparatus to identify the first interaction region in the second application interface; and
identifying the first interaction region in the second application interface based on the touch display operation.

12. The display method of claim 7, further comprising:
controlling the main display screen to display the second application interface based on the touch operation;
controlling the transparent display screen to display the first application interface based on the touch operation;
identifying a second shielding region on the mode adjustment panel based on a second interaction region in the first application interface, wherein the second shielding region shields part of the second application interface; and
controlling the mode adjustment panel to display the second shielding region at the preset transparency, wherein the part of the second application interface is displayed at the preset transparency and superimposed with the second interaction region.

13. A graphical user interface (GUI) on a display apparatus, comprising:
a first shielding region displayed at a preset transparency, wherein the preset transparency is less than or equal to 85%, wherein the display apparatus comprises a transparent touchscreen, a mode adjustment panel, and a main display screen arranged in a stacking manner, and wherein the mode adjustment panel is located between the transparent touchscreen and the main display screen;
a first application interface, wherein a part of the first application interface is shielded by the first shielding region; and
a second application interface superimposed on the first application interface, wherein the first application interface and the second application interface simultaneously display different information, wherein a first interaction region is located at a location region on the second application interface based on a user input received at the first interaction region,
wherein the first interaction region overlays the first shielding region,
wherein the first shielding region overlays the part of the first application interface such that the part of the first application interface does not interfere with a visibility of the first interaction region,
wherein the first application interface and the second application interface are exchanged and displayed, wherein the first shielding region is switched to a second shielding region, wherein a part of the second application interface is shielded by the second shielding region, wherein the first application interface comprises a second interaction region, wherein the second shielding region is displayed at the preset transparency, wherein the part of the second application interface is displayed at the preset transparency and superimposed with the second interaction region, and wherein in response to a user touch operation detected by the transparent touchscreen, the second application interface is displayed on the main display screen, the first application interface is displayed on the transparent touchscreen, and the second shielding region is displayed at the preset transparency on the mode adjustment panel.

14. The GUI of claim 13, wherein a projection of the first interaction region on the mode adjustment panel in a direction perpendicular to the mode adjustment panel falls within the first shielding region, and wherein an area of the first shielding region is greater than an area of the first interaction region.

15. The GUI of claim 13, wherein a projection of the first interaction region on the mode adjustment panel in a direction perpendicular to the mode adjustment panel falls within the first shielding region, and wherein an area of the first shielding region is equal to an area of the first interaction region.

16. The GUI of claim 13, wherein a projection of the first shielding region on the main display screen in a direction perpendicular to the main display screen completely overlaps the part of the first application interface.

17. The GUI of claim 13, wherein the first interaction region in the second application interface is identified when the transparent touchscreen detects a touch display operation.

18. The GUI of claim 13, wherein the user touch operation comprises a predetermined gesture.

19. An intelligent terminal comprising a display apparatus, wherein the display apparatus comprises:
a controller;
a main display screen coupled to the controller and configured to display a first application interface;
a transparent touchscreen coupled to the controller and the main display screen and configured to display a second application interface, wherein the second application interface is superimposed on the first application interface, and wherein the first application interface and the second application interface simultaneously display different information; and
a mode adjustment panel coupled to the controller, the main display screen, and the transparent touchscreen, wherein the mode adjustment panel is located between the transparent touchscreen and the main display screen, and
wherein the controller is configured to:
determine a first interaction region at a location region on the second application interface based on a user input received at the first interaction region;
identify a first shielding region on the mode adjustment panel based on the first interaction region, wherein the first interaction region overlays the first shielding region;
control the mode adjustment panel to display the first shielding region at preset transparency to shield a part of the first application interface, wherein the first shielding region overlays the part of the first application interface such that the part of the first application interface does not interfere with a visibility of the first interaction region; and
obtain a touch operation detected by the transparent touchscreen, wherein the touch operation triggers the display apparatus to exchange the first application interface with the second application interface, and display the first application interface on the transparent touchscreen and the second application interface on the main display screen.

20. The intelligent terminal of claim 19, wherein a projection of the first interaction region on the mode adjustment panel in a direction perpendicular to the mode adjustment panel falls within the first shielding region, and wherein an area of the first shielding region is greater than an area of the first interaction region.

* * * * *

UNITED STATES PATENT AND TRADEMARK OFFICE
CERTIFICATE OF CORRECTION

PATENT NO. : 11,100,895 B2  
APPLICATION NO. : 16/190992  
DATED : August 24, 2021  
INVENTOR(S) : Jizhen Li and Weidong Tang Page 1 of 1

It is certified that error appears in the above-identified patent and that said Letters Patent is hereby corrected as shown below:

In the Claims

Claim 7, Column 38, Line 37: "shielding region; and" should read "shielding region;"

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*